(12) United States Patent
Underwood

(10) Patent No.: US 10,518,916 B2
(45) Date of Patent: Dec. 31, 2019

(54) MATERIAL PROCESSING SYSTEM

(71) Applicant: Daniel S. Underwood, Doerun, GA (US)

(72) Inventor: Daniel S. Underwood, Doerun, GA (US)

(*) Notice: Subject to any disclaimer, the term of this patent is extended or adjusted under 35 U.S.C. 154(b) by 495 days.

(21) Appl. No.: 15/240,675

(22) Filed: Aug. 18, 2016

(65) Prior Publication Data

US 2017/0341259 A1    Nov. 30, 2017

Related U.S. Application Data

(60) Provisional application No. 62/342,404, filed on May 27, 2016.

(51) Int. Cl.
| | | |
|---|---|---|
| *B65B 35/30* | (2006.01) | |
| *B66F 9/00* | (2006.01) | |
| *B65G 59/02* | (2006.01) | |
| *B26D 5/00* | (2006.01) | |
| *B23D 59/00* | (2006.01) | |

(52) U.S. Cl.
CPC ............ *B65B 35/30* (2013.01); *B23D 59/008* (2013.01); *B26D 5/005* (2013.01); *B65G 59/02* (2013.01); *B66F 9/00* (2013.01)

(58) Field of Classification Search
CPC ........... B65B 35/30; B66F 9/00; B65G 59/02; B27B 31/00
USPC ......................................... 414/28, 113, 796.6
See application file for complete search history.

(56) References Cited

U.S. PATENT DOCUMENTS

| | | | | | |
|---|---|---|---|---|---|
| 1,734,176 A | * | 11/1929 | McCabe | ................. | B22D 29/02 164/260 |
| 3,224,731 A | * | 12/1965 | Carlson | .................... | B65G 7/12 254/131 |
| 3,260,379 A | * | 7/1966 | Bason | .................... | B65G 57/26 294/62 |
| 3,343,689 A | * | 9/1967 | Fehely | .................... | B65B 27/10 198/633 |
| 3,737,053 A | * | 6/1973 | Lunden | .................. | B65G 57/18 414/791.8 |
| 3,860,128 A | * | 1/1975 | Lunden | .................. | B65G 57/06 414/789.5 |
| 3,889,825 A | * | 6/1975 | Mosely | .................. | B65G 57/18 414/789.5 |
| 4,310,274 A | * | 1/1982 | Moseley | .............. | B65G 57/112 414/789.5 |
| 4,324,519 A | * | 4/1982 | Moore | ................... | B65G 57/00 101/35 |

(Continued)

*Primary Examiner* — Sean M Michalski
(74) *Attorney, Agent, or Firm* — Taylor English Duma LLP

(57) ABSTRACT

A material processing system includes: an offsetter configured to receive a stack of material and including a lifting bar configured to lift a portion of the stack of material; and a processing station operably connected to the offsetter. A method of processing a material includes: loading a stack of material on an offsetter, the stack of material including a first portion and a second portion, the first portion positioned above the second portion and separated from the second portion by at least one cross tie, the stack of material including a first end and a second end distal from the first end; lifting the second portion away from the first portion by a lifting bar of the offsetter pushing upward on the second end; and removing the cross tie.

21 Claims, 23 Drawing Sheets

(56) References Cited

U.S. PATENT DOCUMENTS

| | | | | |
|---|---|---|---|---|
| 5,002,108 A * | 3/1991 | Jenkner | B23D 47/042 | 144/2.1 |
| 5,007,794 A * | 4/1991 | Lombard | B60P 1/4421 | 414/542 |
| 5,169,284 A * | 12/1992 | Berger | B65G 47/907 | 414/796.9 |
| 5,224,827 A * | 7/1993 | Wong | B65B 63/02 | 414/795.4 |
| 5,314,297 A * | 5/1994 | Herndon | B65G 59/026 | 414/795.7 |
| 5,391,050 A * | 2/1995 | Gatteschi | B65B 43/126 | 414/796 |
| 5,564,893 A * | 10/1996 | Tacchi | B65G 47/902 | 414/796.9 |
| 5,641,266 A * | 6/1997 | Lehtimaki | B27B 31/00 | 414/796 |
| 5,692,878 A * | 12/1997 | Freund | B65G 59/026 | 414/796.6 |
| 5,927,937 A * | 7/1999 | Anderson | B65G 61/00 | 414/744.3 |
| 6,018,858 A * | 2/2000 | Taylor | B25B 27/00 | 29/239 |
| 6,098,512 A * | 8/2000 | Life | B26D 3/10 | 83/286 |
| 6,227,793 B1 * | 5/2001 | Knighten | B25J 9/041 | 294/119.1 |
| 6,379,105 B1 * | 4/2002 | Aylsworth | B65G 59/067 | 198/459.1 |
| 6,468,025 B1 * | 10/2002 | Stumpf | B21D 43/24 | 271/18.1 |
| 6,546,834 B1 * | 4/2003 | Benuzzi | B23D 47/042 | 83/206 |
| 6,652,014 B2 * | 11/2003 | Schmalz | B65G 47/91 | 294/65 |
| 6,923,614 B2 * | 8/2005 | Aylsworth | B23Q 7/10 | 414/789.5 |
| 7,168,910 B2 * | 1/2007 | Keller | B65B 27/08 | 414/791.6 |
| 7,287,952 B2 * | 10/2007 | Ricci | B07C 1/04 | 414/796.6 |
| 8,201,597 B2 * | 6/2012 | Bouchard | B27M 3/0046 | 144/2.1 |
| 8,668,429 B2 * | 3/2014 | Angleitner | B65G 61/00 | 414/795.9 |
| 8,777,551 B1 * | 7/2014 | Widder | B65G 47/90 | 414/796.6 |
| 8,960,244 B1 * | 2/2015 | Aylsworth | B27B 31/00 | 144/245.5 |
| 9,545,868 B1 * | 1/2017 | Downing | B60P 1/48 | |
| 2002/0194969 A1 * | 12/2002 | Jobin | B27B 5/04 | 83/14 |
| 2004/0069106 A1 * | 4/2004 | McAdoo | B27B 5/207 | 83/34 |
| 2005/0076759 A1 * | 4/2005 | Westfall | B23D 45/14 | 83/47 |
| 2005/0262977 A1 * | 12/2005 | Wilkerson | B23D 47/042 | 83/13 |
| 2006/0219073 A1 * | 10/2006 | Urmson | B23D 45/024 | 83/469 |
| 2006/0288831 A1 * | 12/2006 | Koskovich | B27B 5/205 | 83/35 |
| 2008/0112788 A1 * | 5/2008 | Cawley | B65G 59/005 | 414/796.6 |
| 2008/0184856 A1 * | 8/2008 | Koskovich | B27B 5/207 | 83/56 |
| 2010/0077705 A1 * | 4/2010 | Wintring | B65B 25/141 | 53/475 |
| 2012/0037276 A1 * | 2/2012 | Granberg | B27B 1/00 | 144/378 |
| 2012/0060662 A1 * | 3/2012 | Hinshaw | B23D 45/048 | 83/364 |
| 2013/0025420 A1 * | 1/2013 | Gerhardt | B26D 3/30 | 83/13 |
| 2016/0185002 A1 * | 6/2016 | Mueller | A23C 19/0908 | 426/582 |
| 2016/0362258 A1 * | 12/2016 | Anders | B65G 47/261 | |
| 2016/0362259 A1 * | 12/2016 | Papsdorf | B65B 35/44 | |
| 2017/0341259 A1 * | 11/2017 | Underwood | B27B 31/00 | |
| 2018/0319645 A1 * | 11/2018 | Riegraf | B66F 7/00 | |

\* cited by examiner

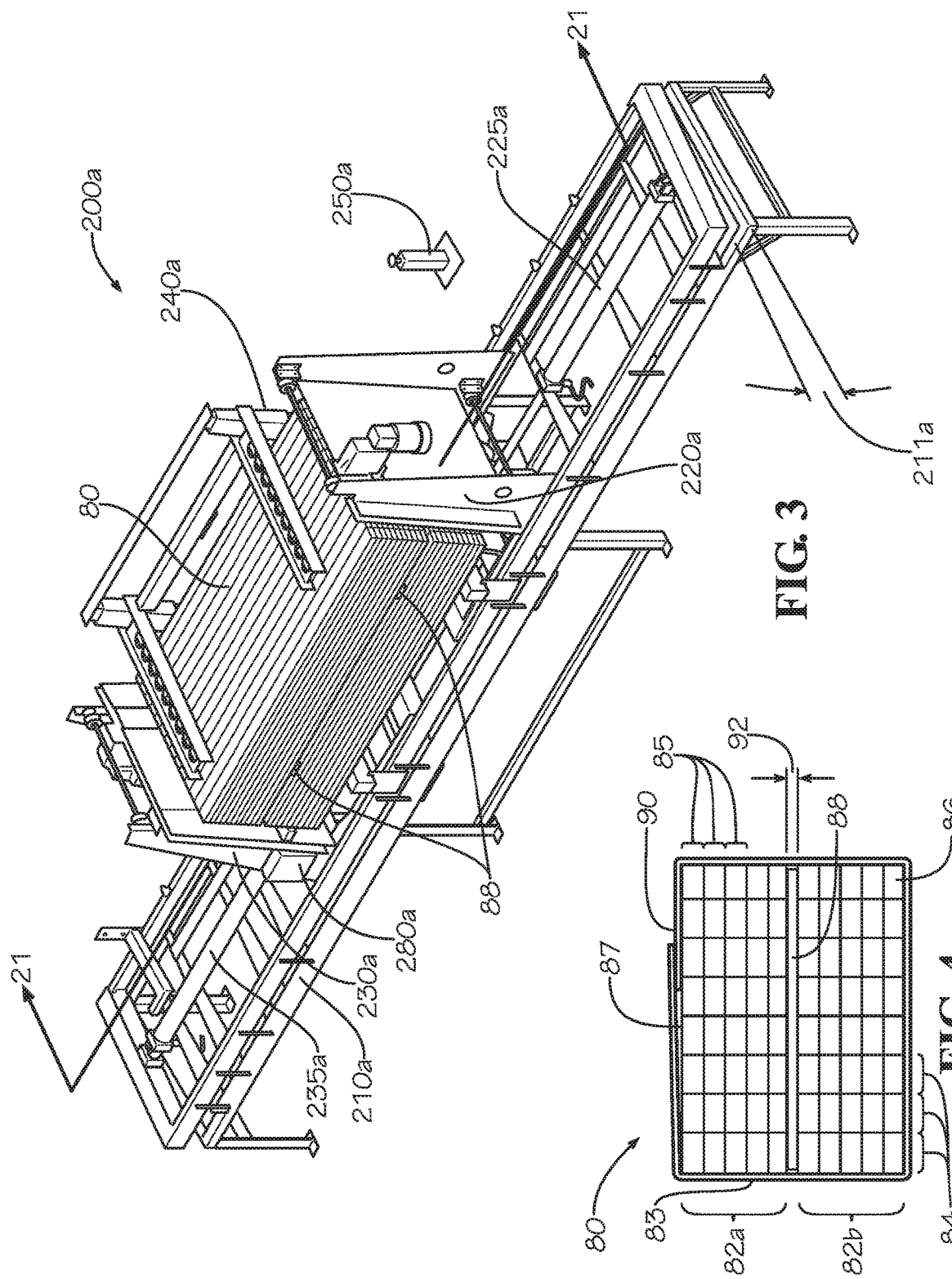

MATERIAL PROCESSING SYSTEM

CROSS-REFERENCE TO RELATED APPLICATIONS

This application claims the benefit of U.S. Provisional Application No. 62/342,404, filed on May 27, 2016, which is hereby specifically incorporated by reference herein in its entirety.

TECHNICAL FIELD

Field of Use

This disclosure relates to material processing systems. More specifically, this disclosure relates to material processing systems for batch cutting of rigid lengths of material comprising a generally rectangular cross section.

Related Art

Various industries including the construction industries make regular use of dimensional lumber and similar materials such as in the building of manufactured homes. It can be beneficial to pre-cut and/or notch various pieces of material off the construction site (i.e., in a different location from where the material is used) and in advance of their use in order to cost-effectively meet the technical specifications of a particular design. For example, a high volume of pieces of a particular non-standard length of dimensional lumber may be useful for building a wall or other building structure, and notches in each of the same pieces may be useful for the installation of electrical and other wiring. Processing such pieces using methods generally available, though, are extremely labor intensive and can result in human error and human injury due to bulkiness of the material, the manual nature of the setting of the equipment and the material for cutting, and the unforgiving nature yet proximity of the industrial-sized cutting equipment used in the process.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a material processing system comprising: an offsetter configured to receive a stack of material and comprising a lifting bar configured to lift a portion of the stack of material; and a processing station operably connected to the offsetter.

In a further aspect, disclosed is a method of processing a material, the method comprising: loading a stack of material on an offsetter, the stack of material comprising a first portion and a second portion, the first portion positioned above the second portion and separated from the second portion by at least one cross tie, the stack of material comprising a first end and a second end distal from the first end; lifting the second portion away from the first portion by a lifting bar of the offsetter pushing upward on the second end; and removing the cross tie.

In a further aspect, disclosed is a method of processing a material, the method comprising: processing a stack of material at a processing station; transporting the stack of material to an outfeed offsetter; pushing a first portion of the stack of material in a direction from a first end of the stack of material to a second end of the stack of material distal from the first end by a lifting bar of the outfeed offsetter; lifting the first portion of the stack of material at the second end by a lifting bar of the outfeed offsetter to create a second portion separated from the first portion by a clearance gap; and inserting a cross tie in the clearance gap.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 3 is a front perspective view of an infeed offsetter of the material processing system of FIG. 1 while loaded with a stack of material comprising cross ties.

FIG. 4 is a side view of the stack of material comprising cross ties in accordance with another aspect of the current disclosure, the stack of material shown prior to processing by the material processing system of FIG. 1.

DETAILED DESCRIPTION

Figure 1:
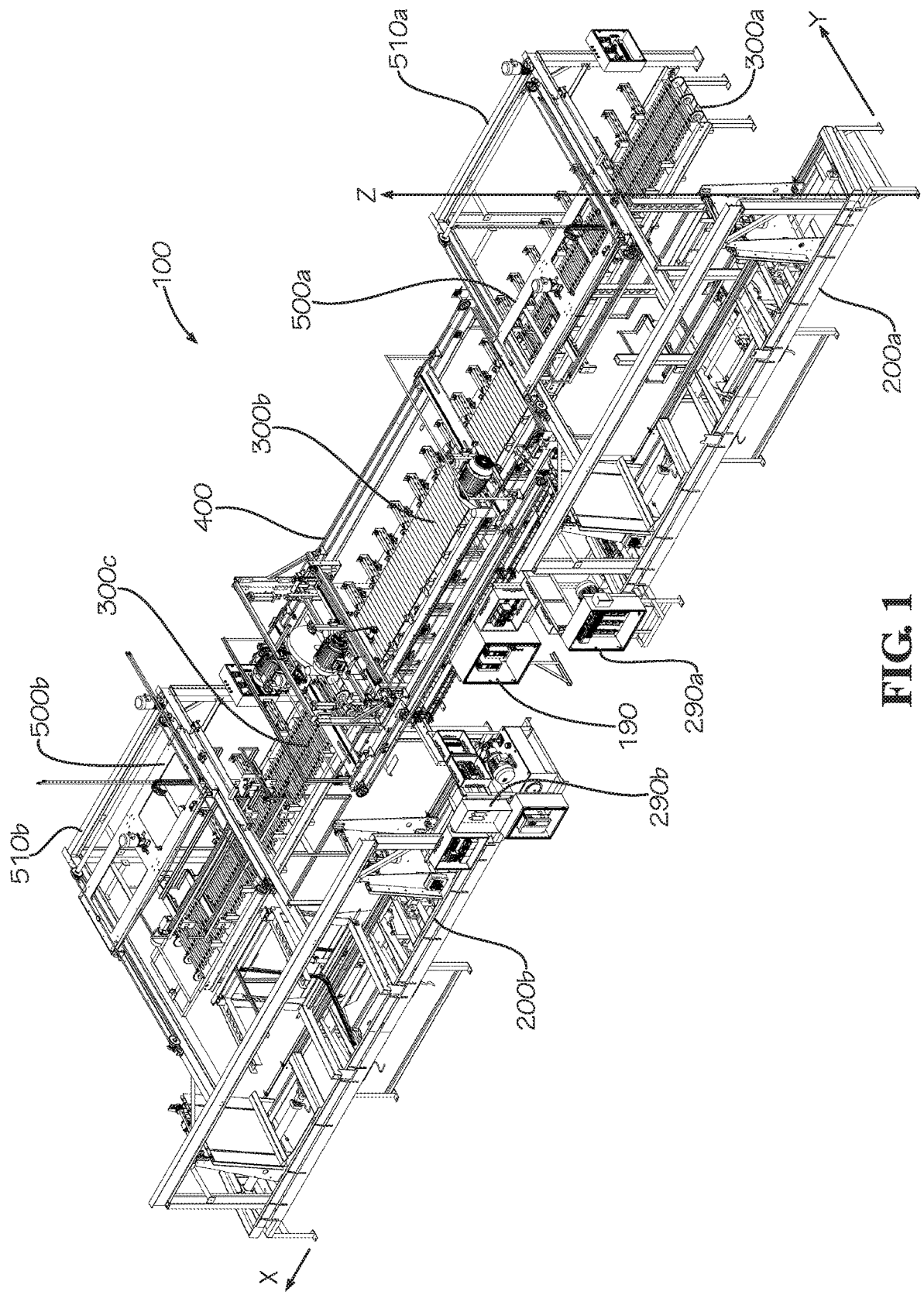
FIG. 1 is a front perspective view of a material processing system in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known embodiment. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can include two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements of material processing systems disclosed herein, the conventions of "front," "rear," "top," "bottom," "upper," "lower," "vertical," "horizontal," "inside," or "outside," may be referenced. Unless stated otherwise here or in the figures, "front" describes that side of the material processing system or any portion thereof that is proximate to the side of the material processing system where material is loaded into and removed from the system and "rear" describes that side of the material processing system that is opposite or distal from the front of the material processing system. Unless stated otherwise here or in the figures, "bottom" describes that side of the material processing system or any portion thereof that is proximate to the floor on which the material processing system is attached or is nearest and "top" describes that side of the material processing system that is opposite or distal from the bottom of the material processing system and is general facing upward or away from the bottom. "Vertical" is that which is aligned along the Z axis as shown in FIG. 1, and "horizontal" is that which is aligned along the X or Y axes as also shown in FIG. 2 or lying in a plane parallel to the plane formed by the X and Y axes.

In one aspect, a material process system and associated methods, systems, devices, and various apparatuses are disclosed herein. In one aspect, the system can comprise at least one offsetter and at least one station for cutting or otherwise processing a material.

Figure 2:
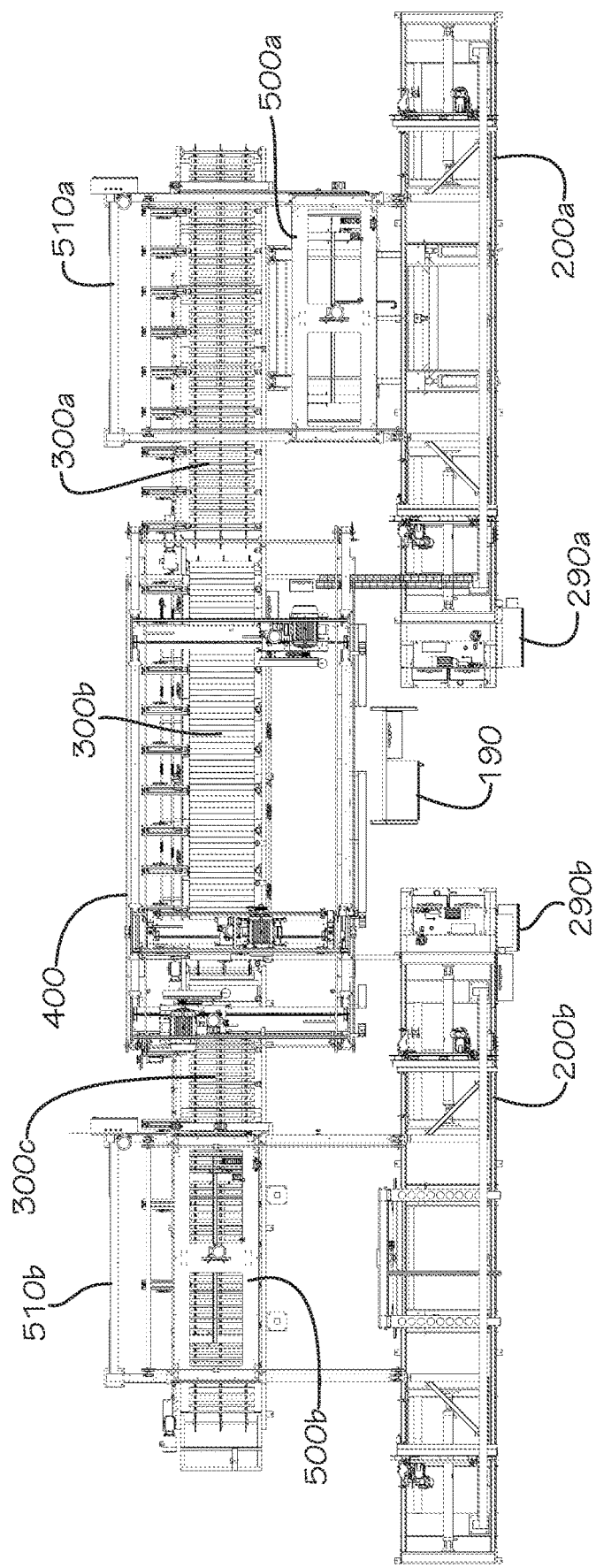
FIG. 2 is a top view of the material processing system of FIG. 1.
Figure 7:
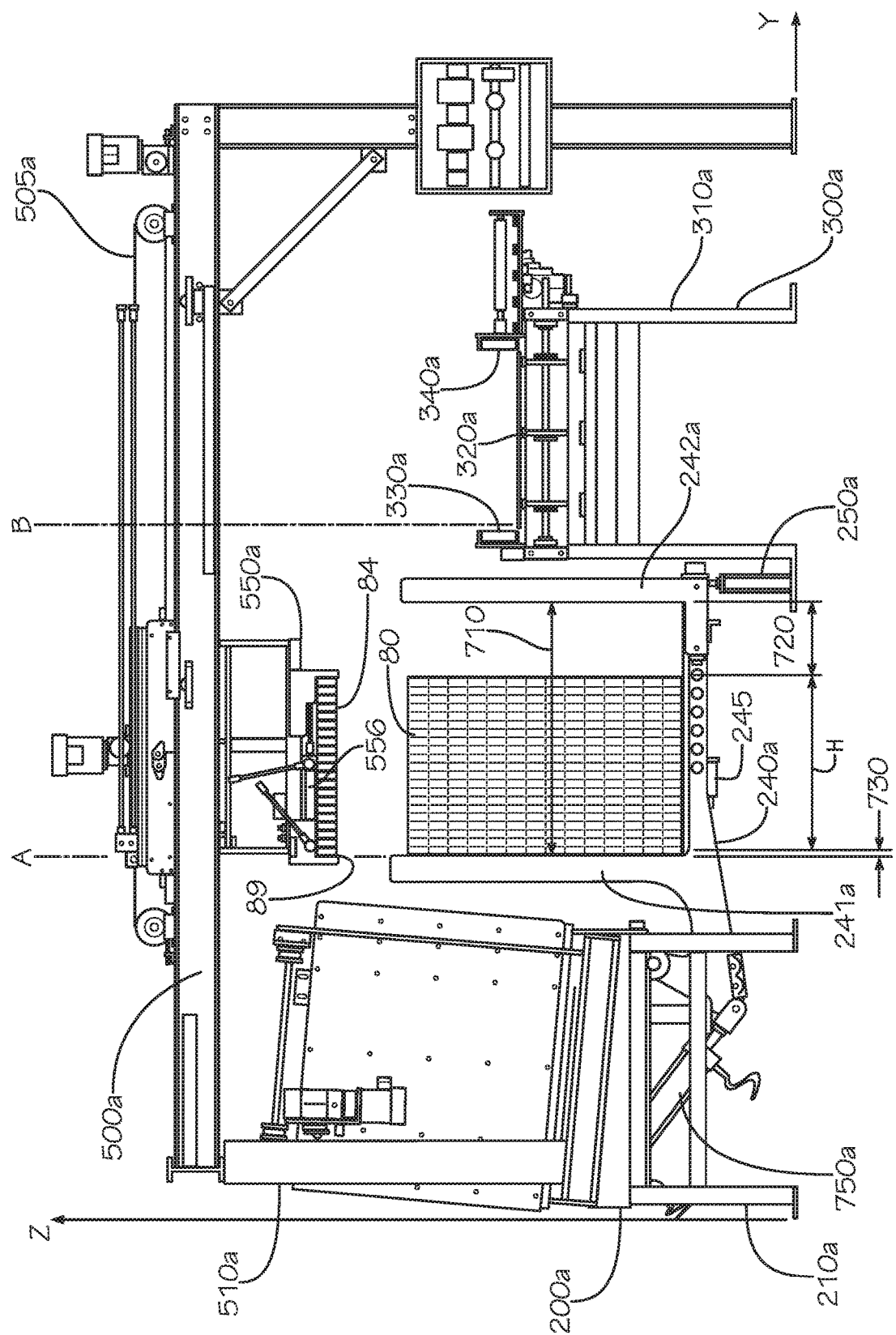
FIG. 7 is a side view of the material processing system of FIG. 1 showing a booklifter transporting a material layer from the infeed offsetter of FIG. 3 to a transfer conveyor.
Figure 19:
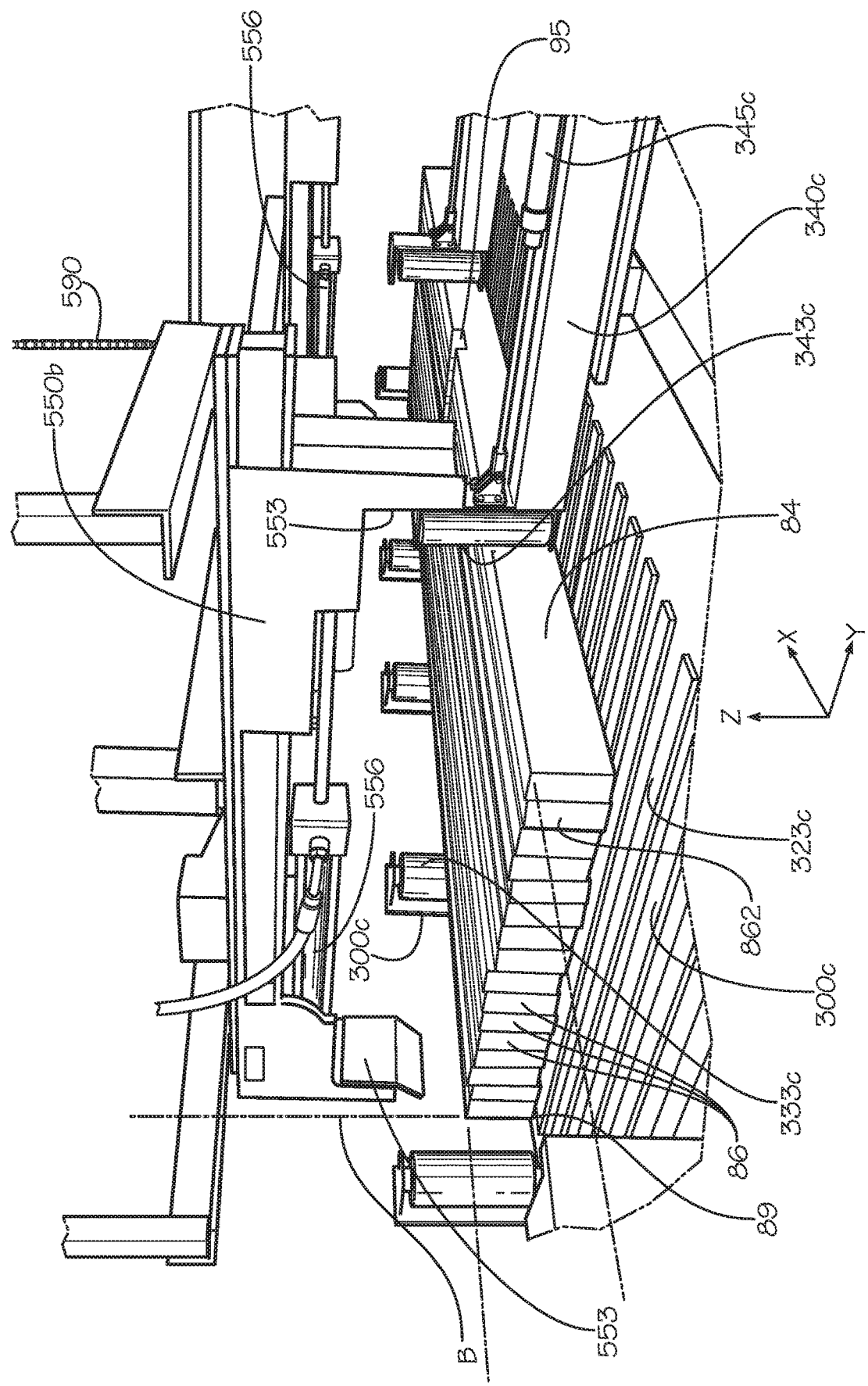
FIG. 19 is a rear perspective view of the outfeed conveyor of FIG. 18 and a gripper of an outfeed booklifter of the material processing system of FIG. 1.

FIGS. 1 and 2 show a material processing system 100 comprising a plurality of subsystems and components, each of which can be arranged in "stations." In one aspect, as shown, the material processing system 100 can comprise an infeed offsetter 200*a*, an outfeed offsetter 200*b*, a transfer conveyor 300*a*, a processing station conveyor 300*b*, an outfeed conveyor 300*c*, a processing station 400—which can be a saw station, and at least one booklifter 500*a,b* comprising a frame 510*a,b* and a gripper 550*a,b* (550*a* shown in FIG. 7, 550*b* shown in FIG. 19). Each of the infeed offsetter 200*a*, the outfeed offsetter 200*b*, the transfer conveyor 300*a*, the processing station conveyor 300*b*, the outfeed conveyor 300*c*, the processing station 400, and the at least one booklifter 500 can comprise controllers, each of which can comprise a programmable logic controller (PLC) and can be operably connected with each other. The material processing system 100 can comprise a controller 190 that synchronizes the operation of each subsystem contained therein. Each of the outfeed offsetters 200*a,b* can respectively comprise controllers 290*a,b* for controlling the operation of each.

As shown in FIG. 3, the infeed offsetter 200*a* can comprise a support frame 210*a*, a first sidewall 220*a*, a second sidewall 230*a*, a tilt assembly 240*a*, a tilt assembly support 250*a*, a manual controller 280*a*, and the controller 290*a* (shown in FIG. 1). The support frame 210*a* can be made stationary, at least relative to the other subsystems of the material processing system 100, by securing various support devices such as legs to the surface on which the support frame 210*a* is positioned. Each of the first sidewall 220*a*, the second sidewall 230*a*, and the tilt assembly 240*a* can be mechanically coupled to the support frame 210*a*. Each of the first sidewall 220*a* and the second sidewall 230*a* can further comprise respective motion control devices 225*a*,235*a* for moving the first sidewall 220*a* and the second sidewall 230*a* with respect to the support frame 210*a*.

In one aspect, a top portion of the support frame 210*a* and each of the first sidewall 220*a* and the second sidewall 230*a* can be angled at a tilt angle 211*a* with respect to the horizontal. This can ensure, for example and without limitation, that a stack of material 80 remains within and settles towards the back of the tilt assembly 240*a*. In another aspect, the tilt angle 211*a* is zero degrees.

The material processing system 100 comprising the infeed offsetter 200*a* can be configured to receive and process the stack of material 80 such as that shown in FIGS. 3 and 4. As shown in FIG. 4, the stack of material 80, which can be initially bundled together by a bundling device 90, can comprise material layers 84,85 (also referred to as "books") of individual pieces 86 (also referred to as "boards") of a material such as lumber. The stack of material 80 can also comprise a side surface 83 and an upper surface 87 that is approximately perpendicular to the side surface 83. As shown, the material layers 84 are oriented or stacked in a vertical direction, and the material layers 85 are oriented or stacked in a horizontal direction. The stack of material 80 also be arranged or divided into any desired number of substacks 82. More specifically, the stack of material 80 can comprise an upper substack 82*a* and a lower substack 82*b*. Adjacent substacks 82 can be separated by a cross tie 88, which can define a clearance gap 92 between adjacent substacks. The stack of material can comprise a first axial end or first end proximate to the first sidewall 220*a,b* and a second axial end or second end distal from the first end and proximate to the second sidewall 230*a,b*.

In one aspect, the stack of material 80 can comprise dimensioned lumber, which can be a wood product or a product comprising a non-wood material such as that made out of a polymer or composite material that is made to conform to dimensional standards in a particular industry. In one aspect, the dimensioned lumber can range in size from that of a "two-by-four" (also referred to as a 2×4) to that of a "two-by-twelve" (also referred to as a 2×12), which respectively measure approximately 1.5 inches thick by approximately 3.5 inches wide and approximately 1.5 inches thick by approximately 11.25 inches wide. In another aspect, the dimensioned lumber can be sized outside of this range by being thinner or thicker than approximately 1.5 inches or by being narrower than approximately 3.5 inches or wider than approximately 11.25 inches. In another aspect, the dimensioned lumber can be sizes such as "four-by-four," "six-by-six," "eight-by-eight," "ten-by-ten," or "twelve-by-twelve," all of which are commonly known in the art and which can be used for fence posts or supports, for example. In yet another aspect, the dimensioned lumber can be a smaller size such as a "two-by-two," "two-by-three," or various sizes of "one-by" or "5/4" size lumber (the latter having approximate thicknesses of ¾ inch and 1 inch, respectively), all of which are also commonly known in the art.

In yet another aspect, the stack of material 80 can comprise a material other than lumber including, for example and without limitation, boards comprising plywood, medium-density fiberboard (MDF), oriented strand board (OSB) or particle board, or foam material. In one aspect, the material processing system 100 is designed to accommodate No. 2 or better graded-lumber or the equivalent, which may contain some wane or bow or other defects. In another aspect, the material processing system 100 can be configured to accommodate lower grade material and material having no grade or at least not identified as complying with a particular grade. In one aspect, the material processing system 100 can process, for example and without limitation, rigid lengths or pieces 86 of any material comprising, for example and without limitation, a generally rectangular cross section. In another aspect, the material process system 100 can process any material having any cross-sectional shape that can be stacked or lined up in rows or layers. In one aspect, the material processing system 100 can process material comprising a finished length of between 81 inches and 16 feet inclusive. In another aspect, the material processing system 100 can process material comprising a finished length outside of this range by adjusting the size of the material processing system 100 and various components thereof.

In one aspect, the cross tie 88 is placed between adjacent substacks 82 in the stack of material 80 to maintain the shape of the stack of material 80 even during transport of the stack of material 80 by various manual or automatic mechanisms. Without the cross ties 88, transport of the stack of material 80 in some instances, especially rough transport, can cause deformation or collapse of the stack of material 80, which can be caused by dislocation of individual pieces 86 or by bending or the entire stack of material 80. The deformation or collapse of the stack of material 80 can be prevented by use of the cross ties 88 between the substacks 82 by each cross tie 88 providing a single continuous surface against which each material layer 84 of the individual pieces 86 can be held tight. In another aspect, including when the individual pieces are larger two-by-eight, two-by-ten, or two-by-twelve boards or their equivalent, no cross ties 88 are required to maintain the integrity of the stack of material 80.

Figure 5:
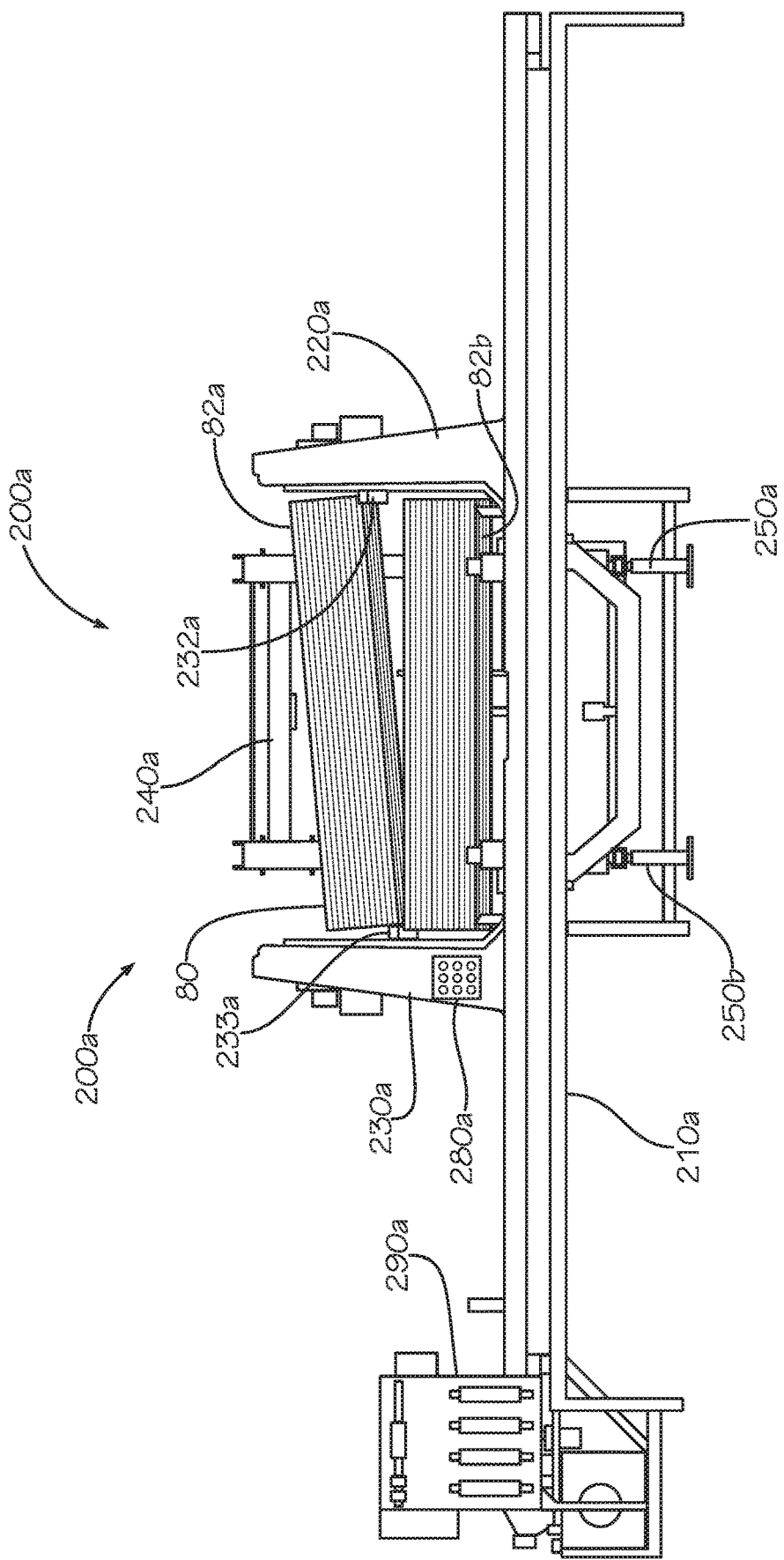
FIG. 5 is a front view of the infeed offsetter of FIG. 3 during a cross tie removal operation on the stack of material.
Figure 6:
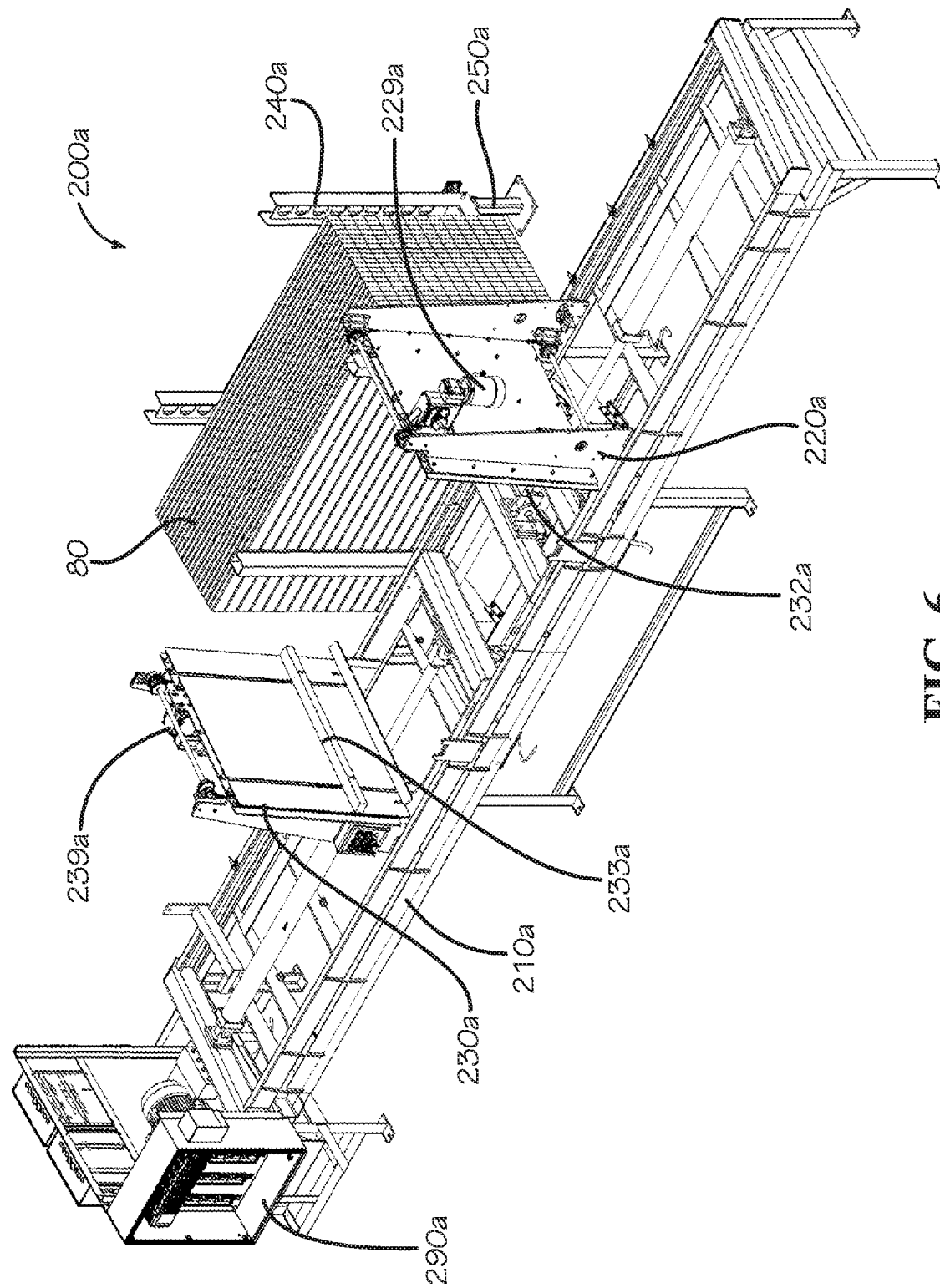
FIG. 6 is a front perspective view of the infeed offsetter of FIG. 3 after rotation of the stack of material.

FIGS. 5 and 6, respectively, show front and perspective views of the infeed offsetter 200*a* during initial processing of the stack of material 80. As shown in FIG. 6, each of the first sidewalls 220*a,b* (220*b* shown in FIG. 20) and each of the second sidewalls 230*a,b* (230*b* shown in FIG. 20) can respectively comprise a lifting bar 232*a,b* and a lifting bar 233*a,b* (232*b* and 233*b* shown in FIG. 20), each of which can be made to protrude from the surface of the respective sidewalls 220*a,b* and 230*a,b*. In one aspect, each of the lifting bars 232,233 can comprise a rectangular cross-section defining a top surface, a bottom surface distal from the top surface, an inner vertical surface facing inward towards the opposite side wall, and an outer vertical surface facing outwards towards the sidewall to which the lifting bar 232,233 is mounted. In another aspect, each of the lifting bars 232,233 can comprise a triangular cross-section with a top surface that is flat. Each of the lifting bars 232,233 can be angled at the same tilt angle 211*a* as desired to match the angle at which the stack of material 80 is tilted on the offsetter 200*a,b* (200*b* shown in FIG. 1). Each of the first sidewalls 220*a,b* can respectively comprise a motion control device 229*a,b*, respectively, for adjusting the vertical position of the lifting bars 232*a,b*, and each of the second sidewalls 230*a,b* can respectively comprise a motion control device 239*a,b* for adjusting the vertical position of the lifting bars 233*a,b*.

Figure 8:
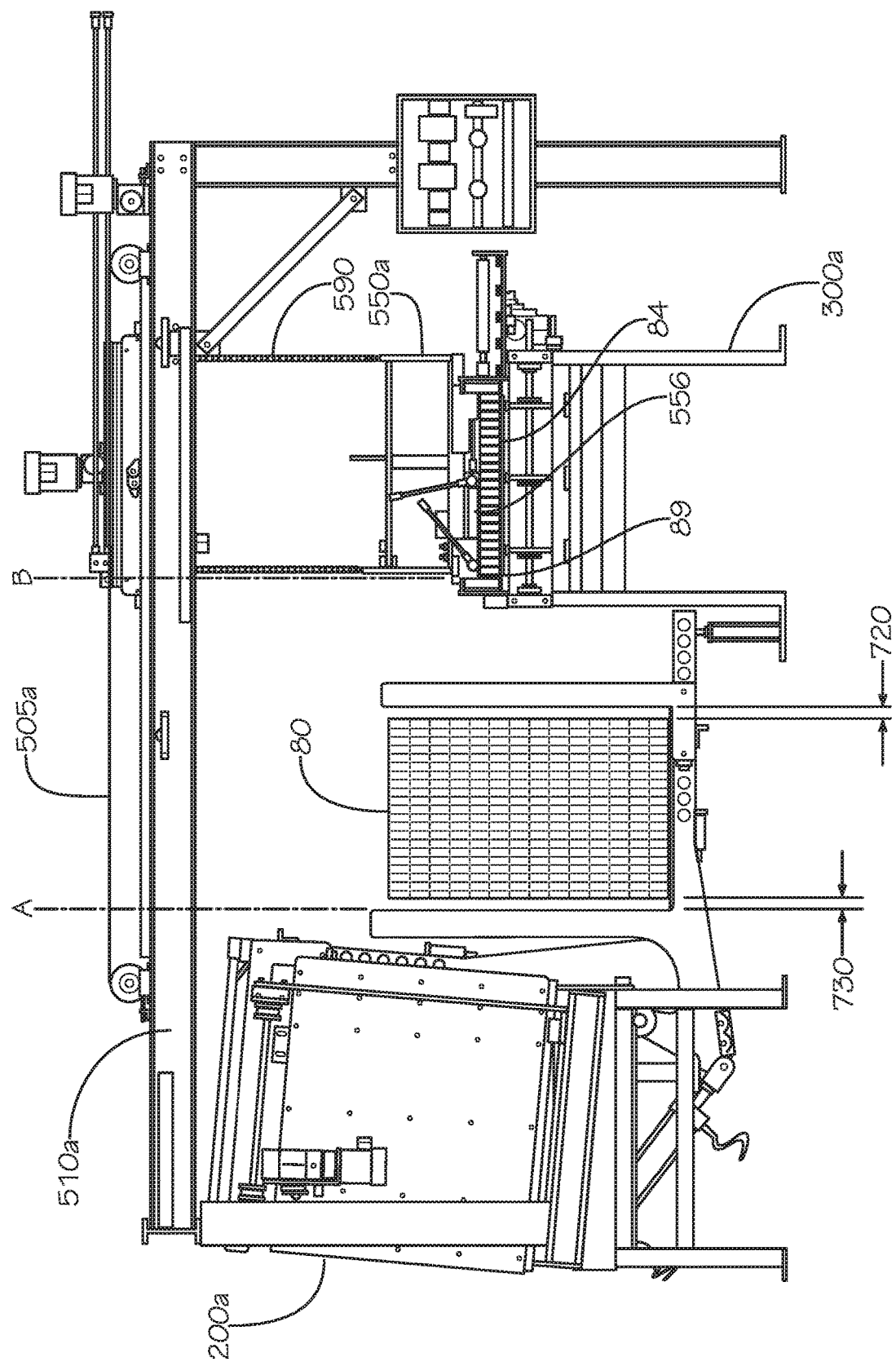
FIG. 8 is a side view of the material processing system of FIG. 1 after the material layer has been placed on the transfer conveyor.

FIGS. 7 and 8 show a side view of the infeed offsetter 200*a* as well as the infeed booklifter 500*a* and the transfer conveyor 300*a* during additional processing of the stack of material 80. As shown, the tilt assembly 240*a* can rest on the tilt assembly support 250*a* in the position shown. Each of the tilt assemblies 240*a,b* of the respective offsetters 200*a,b* can comprise a fixed frame 241*a,b*, an adjustable frame 242*a,b* distal from the fixed frame 241*a,b*, and motion control devices 245 that can adjust the distance 710 between the adjustable frame 242*a,b* and the fixed frame 241*a,b*, the gaps 720 between the adjustable frame 242*a,b* and the stack of material 80, and the gap 730 between the fixed frame 241*a,b* and the stack of material 80. Each of the tilt assemblies 240*a,b* can further comprise a motion control device 750*a,b* for rotating the tilt assembly 240*a,b* with respect to the support frame 210*a,b*.

Before or during rotation of the stack of material 80 in the tilt assemblies 240*a,b*, the distance 710 can be made approximately equal to a height H of the stack of material 80, with the height H being the height of the stack of material 80 in its original bundled orientation on the infeed offsetter 200*a*. A distance 710 that is approximately equal to the height H will result in the gaps 720,730 measuring approximately zero. After rotation of the stack of material 80 in the tilt assemblies 240*a,b*, the distance 710 can be made slightly larger than the height H of the stack of material 80. A distance 710 that is slightly larger than the height H will result in gaps 720,730 measuring a desired amount to make it possible to remove material layers 84 from the stack of material 80 without interference with either the fixed frame 241*a,b* or the adjustable frame 242*a,b* and without interference between the gripper 550*a,b* and the tilt assembly 240*a,b*.

In one aspect, the stack of material 80 can comprise as many as 15 or more material layers 84 of a "two-by" material measuring approximately 3.5 inches in width or a different number of individual pieces 86 having a different size but measuring an equivalent width overall, and the material layer 84 can comprise as many as 20 or 30 individual pieces 86 of a "two-by" material measuring approximately 1.5 inches in thickness or a different number of individual pieces 86 having a different size but measuring an equivalent thickness overall. In another aspect, each stack of material 80 can comprise a larger or smaller number of material layers 84, and each material layer 84 can comprise a larger or smaller number of individual pieces 86.

Each of the frames 510*a,b* of the respective booklifters 500*a,b* can be configured to straddle at least a portion of the respective offsetters 200*a,b* and the respective conveyors 300*a,c*. Each of the frames 510*a,b* can also be configured to support the weight of the grippers 550*a,b* and any items the grippers 550*a,b* pick up such as individual material layers 84 of the stack of material 80. As shown, after rotation of the stack of material 80 by the tilt assembly 240*a*, the material layers 84 are oriented in a horizontal direction, and the material layers 85 (shown in FIG. 4) are oriented in a vertical direction. The frame 510*a* of the infeed booklifter 500*a* (and likewise the outfeed booklifter 500*b*) can be sized and positioned such that the gripper 550*a* can be made to align at a position A along the Y axis with the stack of material 80 in the tilt assembly 240*a* in order to pick up the topmost material layer 84 from the stack of material 80. The frame 510*a* of the infeed booklifter 500*a* can also be sized and positioned such that the gripper 550*a* can be made to align at a position B along the Y axis with the transfer conveyor 300*a* in order to move the material layer 84 above and onto the transfer conveyor 300*a*. In one aspect, the reference edge of the material layer 84 is a front edge 89. The grippers 550*a,b* of the respective booklifters 500*a,b* can be coupled to and suspended from the respective frames 510*a,b* using any mechanical linkage 590 (shown in FIG. 8) such as, for example and without limitation, chain or rope and, like the other components of the material processing system 100, can be formed from any metallic material or non-metallic material comprising desirable properties (e.g., high strength and no or low elasticity). Each of the grippers 550*a,b* of the respective booklifters 500*a,b* can be raised or lowered by simultaneously extending or retracting each portion of the mechanical linkage 590 such that the material layer 84 remains level. Each of the booklifters 500*a,b* can further comprise a motion control device 505*a,b* for movement of the respective grippers 550*a,b* along the X or Y axes. Each of the grippers 550*a,b* of the respective booklifters 500*a,b* can comprise control cylinders 556 for opening and closing each of a set of opposing jaws 553 (shown in FIG. 19) of the gripper 550*a,b*. Each jaw 553 can defined a taper towards a bottom edge of each jaw 553 such that a distance between an opposing pair of jaws 553 is greater at the bottom of the opposing pair of jaws 553 than at the top of the opposing pair of jaws 553 to aid in receiving the material layer 84 without catching on one side or the other of the material layer 84.

Figure 9:
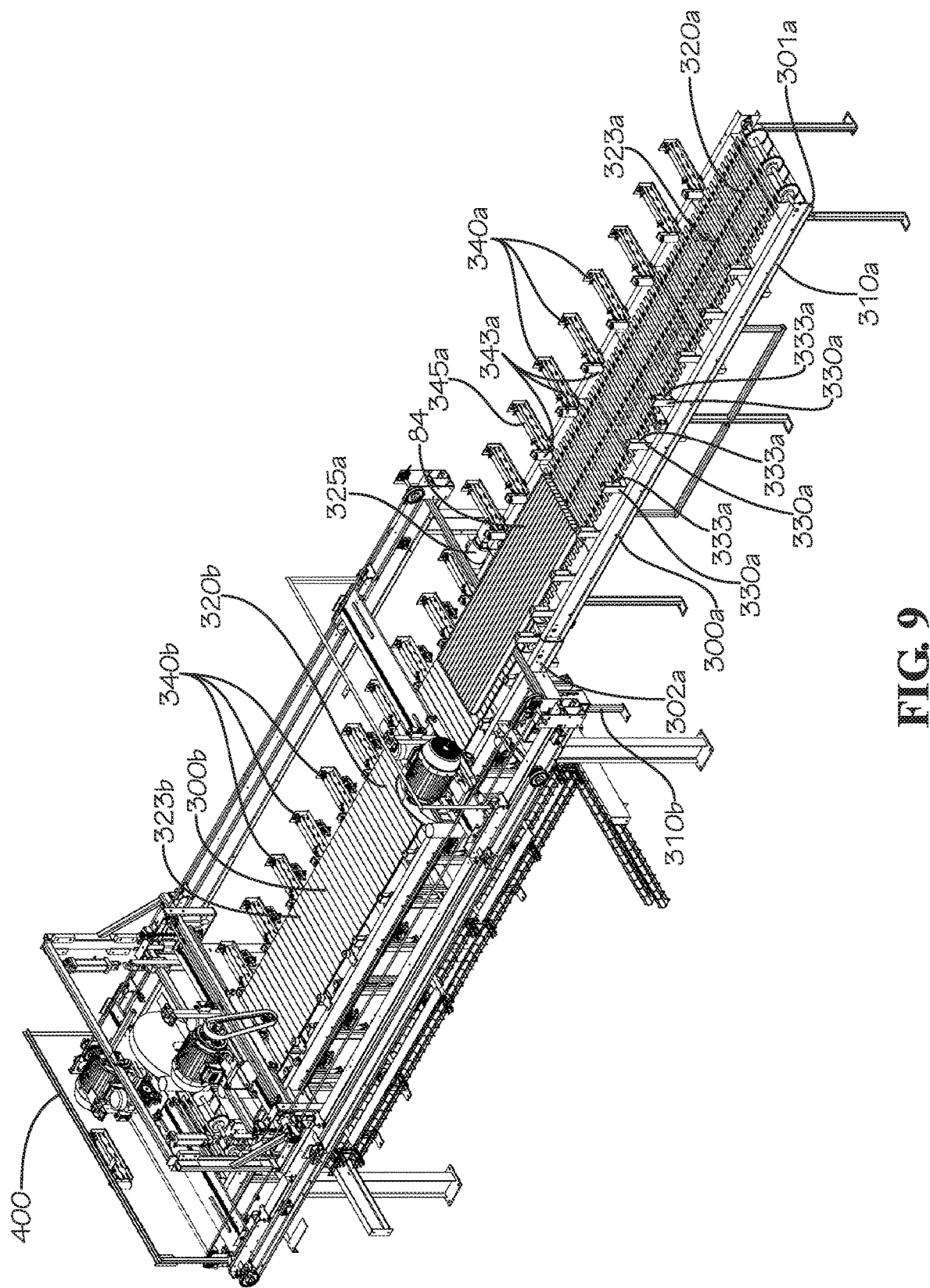
FIG. 9 is a front perspective view of a processing station and the transfer conveyor of the material processing system of FIG. 1 as the material layer is transported from the transfer conveyor to the processing station.
Figure 18:
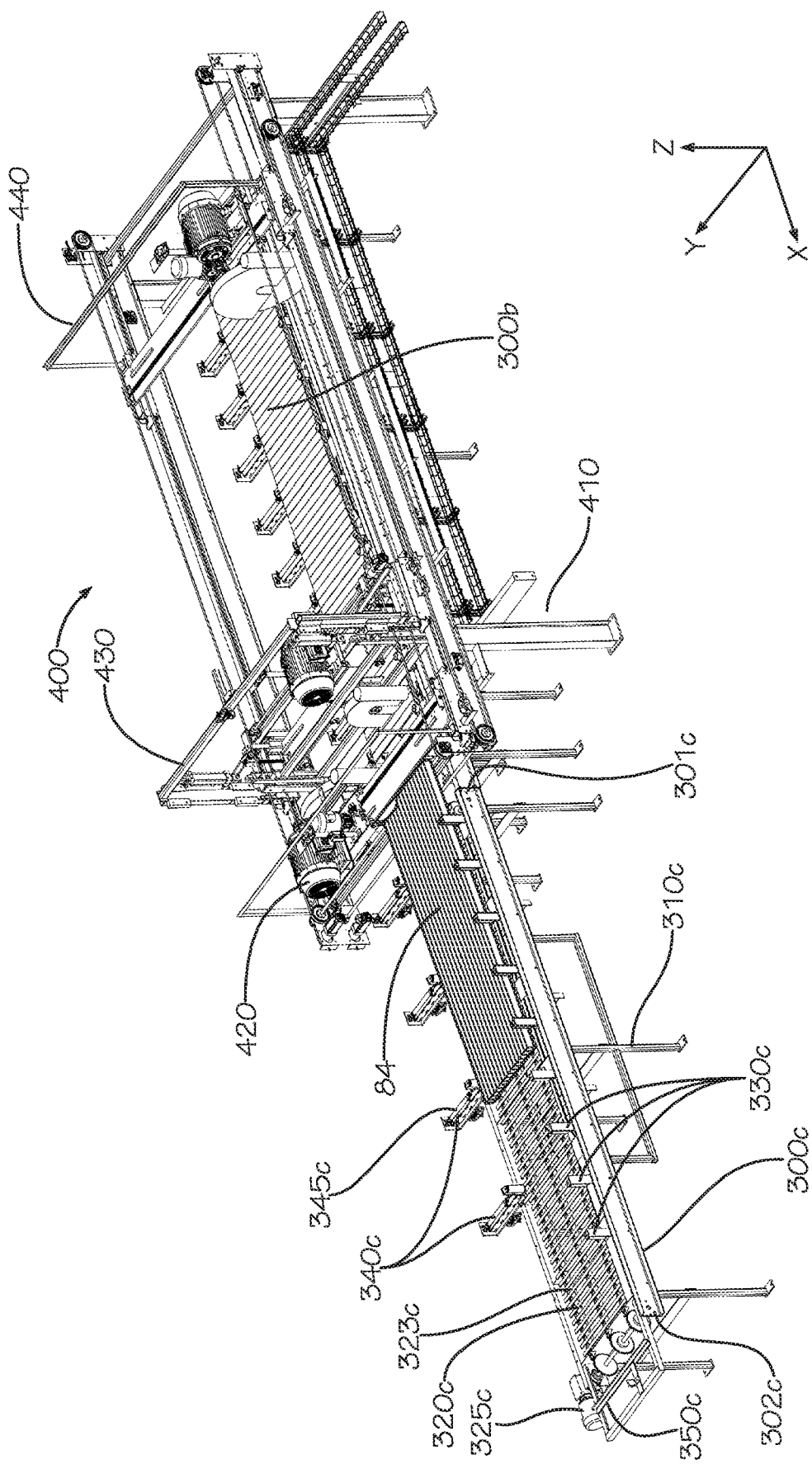
FIG. 18 is a front perspective view of the processing station and an outfeed conveyor of the material processing system of FIG. 1.

In one aspect, as shown in FIGS. 7 and 8, the transfer conveyor 300*a* can be operably connected to the infeed offsetter 200*a*. As shown in FIGS. 7, 9, and 18, each of the transfer conveyor 300*a*, the processing station conveyor 300*b*, and the outfeed conveyor 300*c* can respectively comprise a support frame 310*a,b,c* (310*b* shown in FIGS. 9 and 310*c* shown in FIG. 18) and a conveyor 320*a,b,c* (320*b* shown in FIGS. 9 and 320*c* shown in FIG. 18). Each of the support frames 310*a,b,c* can be made stationary, at least relative to the other subsystems of the material processing system 100, by securing the support frame 310*a,b,c* using various support devices such as legs and fasteners to the surface on which the support frame 310*a,b,c* is positioned. Each of the conveyors 320*a,b,c* can be mechanically coupled to the support frame 310*a*.

As shown in FIGS. 7, 9, and 18, each of the transfer conveyor 300*a*, the processing station conveyor 300*b*, and the outfeed conveyor 300*c* can respectively comprise a belt 323*a,b,c* (323*c* shown in FIG. 18) and a motion control device 325*a,b,c* (325*c* shown in FIG. 18) for moving the belt 323*a,b,c* with respect to the support frame 310*a,b,c*. Each of the belts 323*a,b,c* can be continuous (as shown in the belt 323*b* of the processing station conveyor 300*b*) or non-continuous (as reflected in the belts 323*a,c* of the transfer conveyor 300a and the outfeed conveyor 300c, respectively) and can comprise any solid or porous surface. Each of the motion control devices 325a,b,c can comprise a motor and power transmission devices such as belts, chains, pulleys, and/or gearboxes to move the belt 323a,b,c. In one aspect, each of the belts 323a,b,c is supported in a horizontal orientation (i.e., is made to remain flat) so that any downward pressure resulting from, for example and without limitation, the weight of the material layer 84 or any component of the processing station 400 pressing against the material layer 84, will not in any significant way move or deform the belt 323a,b,c. In one aspect, either the belt 323b or any of the belts 323a,b,c can define grooves or notches or gaps that allow passage of moving parts of the processing station 400 during processing of the material layer 84. In another aspect, the belt 323b or any of the belts 323a,b,c comprises a material that can be cut without detrimentally affecting the operation of the belts 323a,b,c.

Figure 10:
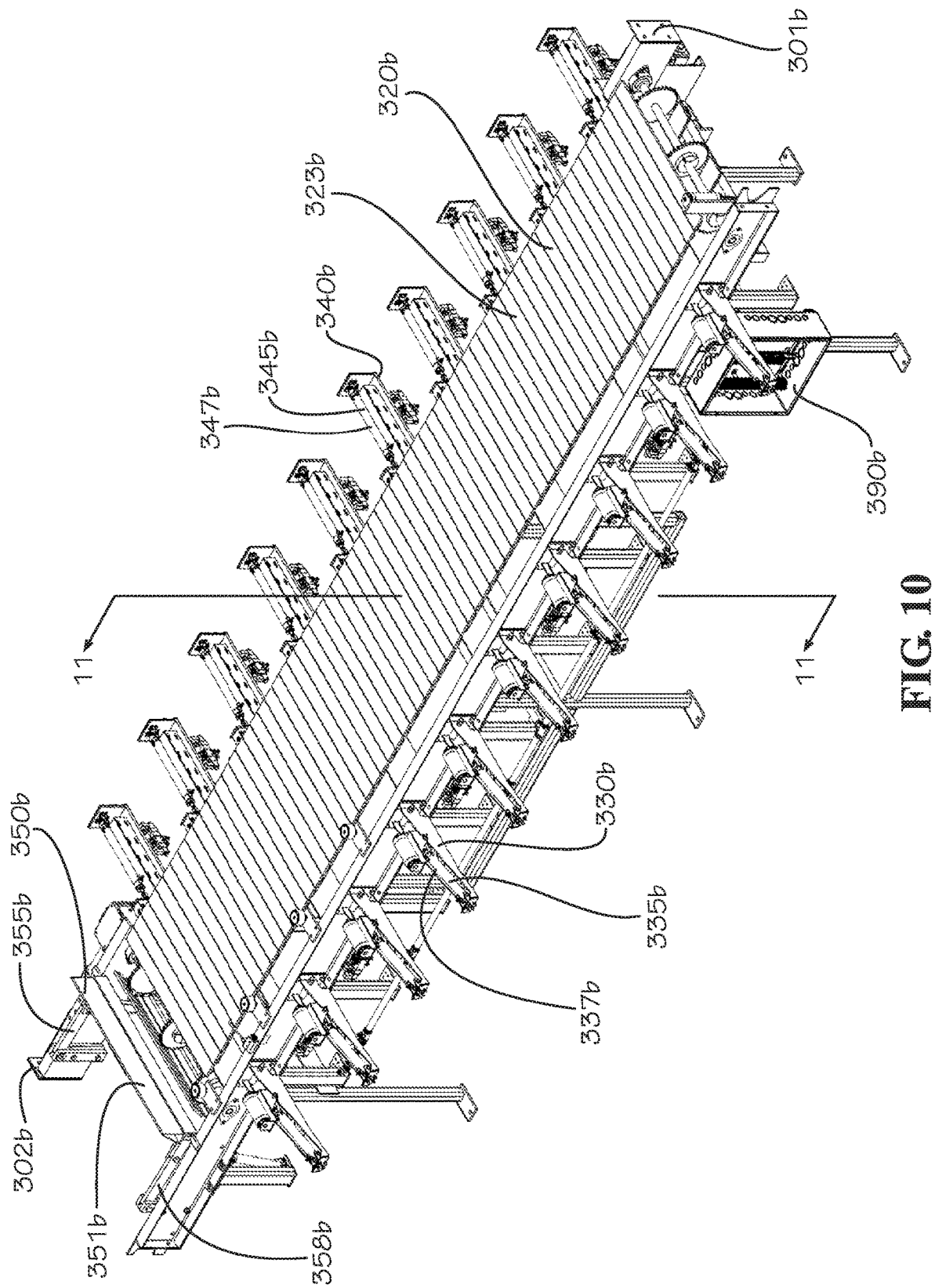
FIG. 10 is a front perspective view of a processing station conveyor of the processing station of FIG. 9.

Each of the transfer conveyor 300a, the processing station conveyor 300b, and the outfeed conveyor 300c can respectively comprise a plurality of first guides 330a,b,c (330b shown in FIGS. 10 and 330c shown in FIG. 18) and a plurality of second guides 340a,b,c (340b shown in FIGS. 9 and 340c shown in FIG. 18) positioned between an infeed side 301a,b,c (301b shown in FIGS. 10 and 301c shown in FIG. 18) and an outfeed side 302a,b,c (302b shown in FIGS. 10 and 302c shown in FIG. 18) that can be mechanically coupled to the respective support frame 310a,b,c and independently controlled by the controller 190. The first guides 330a,b,c can be front guides and the second guides 340a,b,c can be rear guides.

Figure 11:
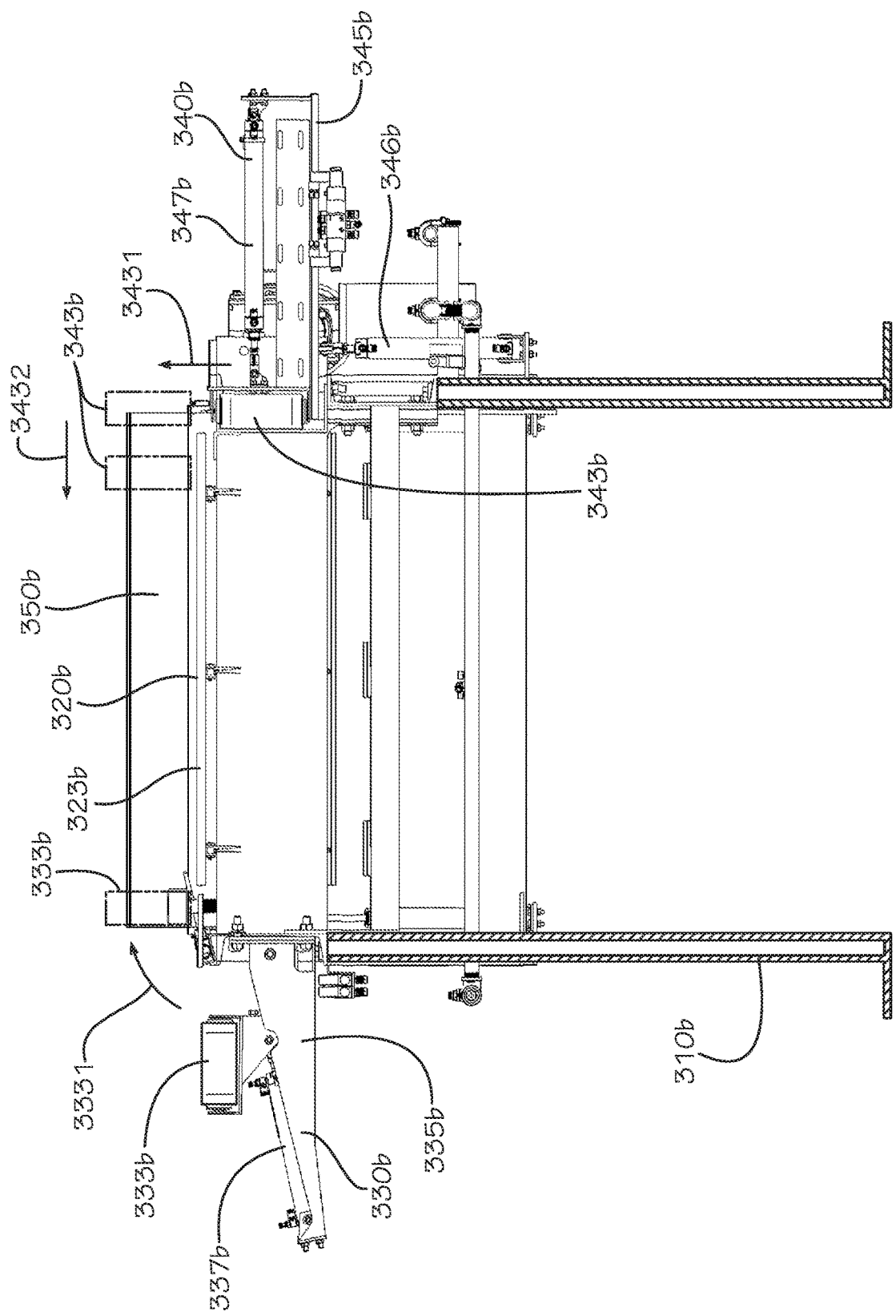
FIG. 11 is a side sectional view of the processing station conveyor FIG. 10 taken along line 11-11 of FIG. 10.

In one aspect, each of the plurality of first guides 330a,b,c and the plurality of second guides 340a,b,c can be fixed with respect to the respective support frame 310a,b,c and the respective conveyor 320a,b,c. Each of the plurality of first guides 330a,b,c and the plurality of second guides 340a,b,c can be configured to form a low-friction vertical surface against which an edge of the material layer 84 of material can be held stationary and/or guided during transport of the material layer 84 along the conveyor 320a,b,c. As seen in FIGS. 7, 9, 11, and 19, for example and without limitation, each of the plurality of first guides 330a,b,c and the plurality of second guides 340a,b,c can incorporate such a low-friction vertical surface through respective use of rollers 333a,b,c and rollers 343a,b,c (333a and 343a shown in FIGS. 9, 333b and 343b shown in FIG. 11, and 333c and 343c shown in FIG. 19).

In another aspect, each of the first guides 330a,b,c and the second guides 340a,b,c can further comprise respective motion control devices 335a,b,c (335b shown in FIGS. 10, 335c not shown) and motion control devices 345a,b,c (345b shown in FIGS. 10, 345c shown in FIG. 18) for moving the first guides 330a,b,c and the second guides 340a,b,c with respect to the respective support frame 310a,b,c. In such aspect, the position—including the angular orientation—of the first guides 330a,b,c and the second guides 340a,b,c can be adjusted. Each of the first guides 330a,b,c and the second guides 340a,b,c can be moved away from the material layer 84 and can even be made to drop below a top surface of the respective belt 323a,b,c of the conveyor 320a,b,c to provide clearance for the movement of material and/or other components of the material processing system 100.

In one aspect, each of the transfer conveyor 300a, the processing station conveyor 300b, and the outfeed conveyor 300c can respectively comprise a controller 390a,b,c (390b shown in FIGS. 10 and 390a,c not shown) for controlling the operation of each of the conveyor 320a,b,c, the first guides 330a,b,c, and the second guides 340a,b,c as desired. In another aspect, the controller 190 can control the operation of each of the conveyor 320a,b,c, the first guides 330a,b,c, and the second guides 340a,b,c. Various sensors (not shown) for sensing the location of the material layer 84 can be used to determine the position of the conveyors 320a,b,c, the first guides 330a,b,c, and the second guides 340a,b,c at any one moment during operation of the transfer conveyor 320a, the processing station conveyor 300b, and the outfeed conveyor 300c.

Each of the transfer conveyor 300a, the processing station conveyor 300b, and the outfeed conveyor 300c can respectively comprise a material stop 350a,b,c (350a not shown, 350b shown in FIG. 10, and 350c shown in FIG. 18). Each of the material stops 350a,b,c can be positioned at the infeed side 301a,b,c or at the outfeed side 302a,b,c of the respective conveyor 300a,b,c and can be fixed or movable.

In one aspect, as shown in FIG. 9, the processing station conveyor 300b can be operably connected to the transfer conveyor 300a. The processing station 400 can be sized and positioned to straddle the processing station conveyor 300b in order to process material positioned on the processing station conveyor 300b.

In one aspect, as shown in FIGS. 10 and 11, each of the motion control devices 335b can comprise a control cylinder 337b for rotating the roller 333b about a pivot point in a motion path 3331 (or in a motion path opposite thereto). Each of the motion control devices 345b can comprise a control cylinder 346b for raising the portion of the second guide 340b comprising roller 343b into a position adjacent to the belt 323b in a motion path 3431 (or in a motion path opposite thereto). Each of the motion control devices 345b can comprise a control cylinder 347b for extending the roller 343b horizontally towards the center of the belt 323b in order to engage the material layer 84 in a motion path 3432 (or in a motion path opposite thereto). FIGS. 7 and 8, respectively, show the position of the first guides 330a and the second guides 340a as preparing to engage and engaging with the material layer 84 of the stack of material 80. The control cylinders 337b,346b,347b can be of a pneumatic type driven by air or a hydraulic type driven by hydraulic fluid or of any other type. It is contemplated that the control cylinders 337b,346b,347b can be replaced with any device accomplishing the same motion control purpose.

The material stop 350b can comprise a motion control device 355b that is configured to raise, lower, or otherwise move a stop surface 351b of the material stop 350b. The stop surface 351b can be made to remain in a vertical orientation as shown or can be moved to a horizontal orientation by the motion control device 355b. The motion control device 355b can comprise a control cylinder (not shown) and a control linkage 358b.

Figure 12:
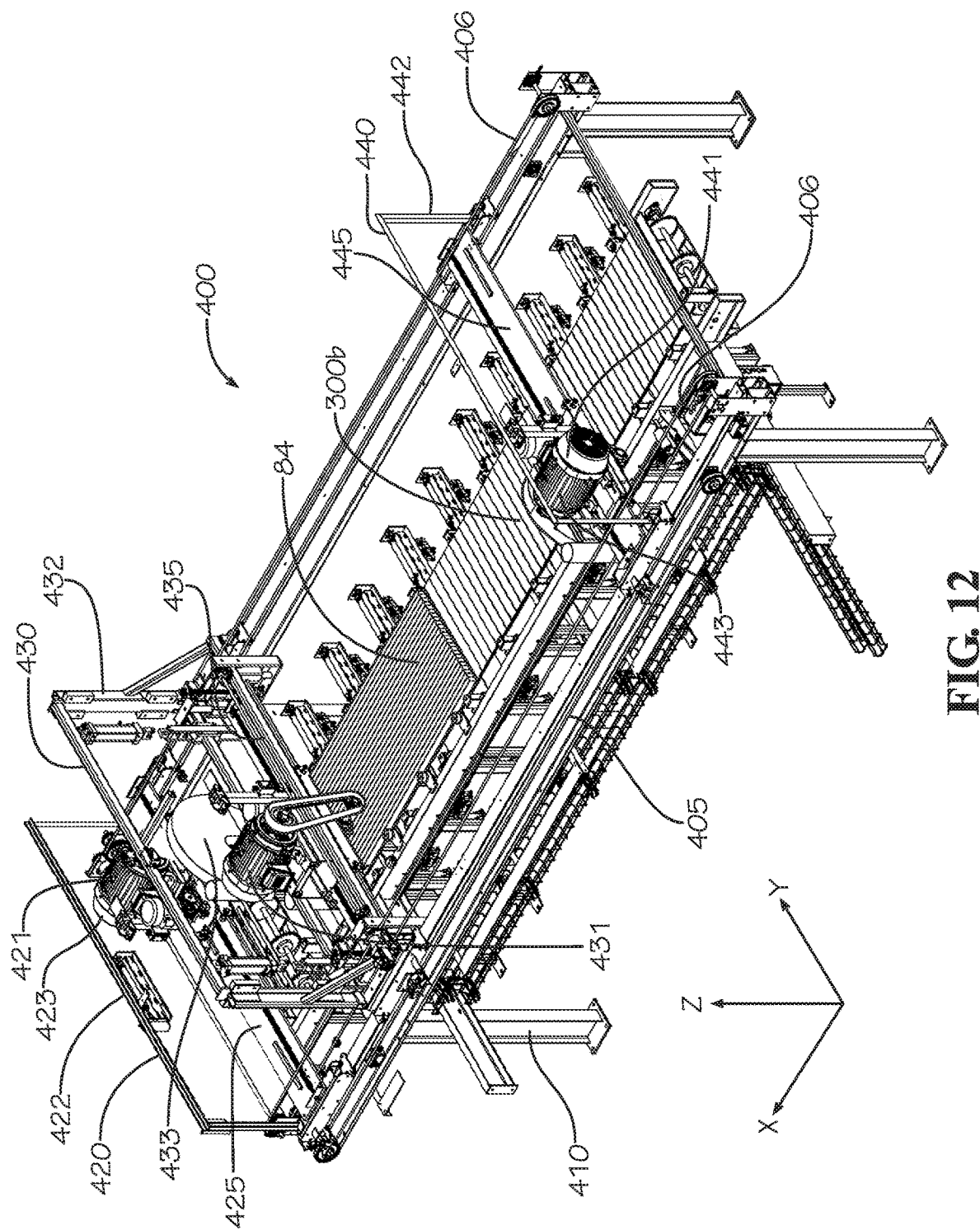
FIG. 12 is a front perspective view of the processing station of FIG. 9 showing the material layer being processed.
Figure 13:
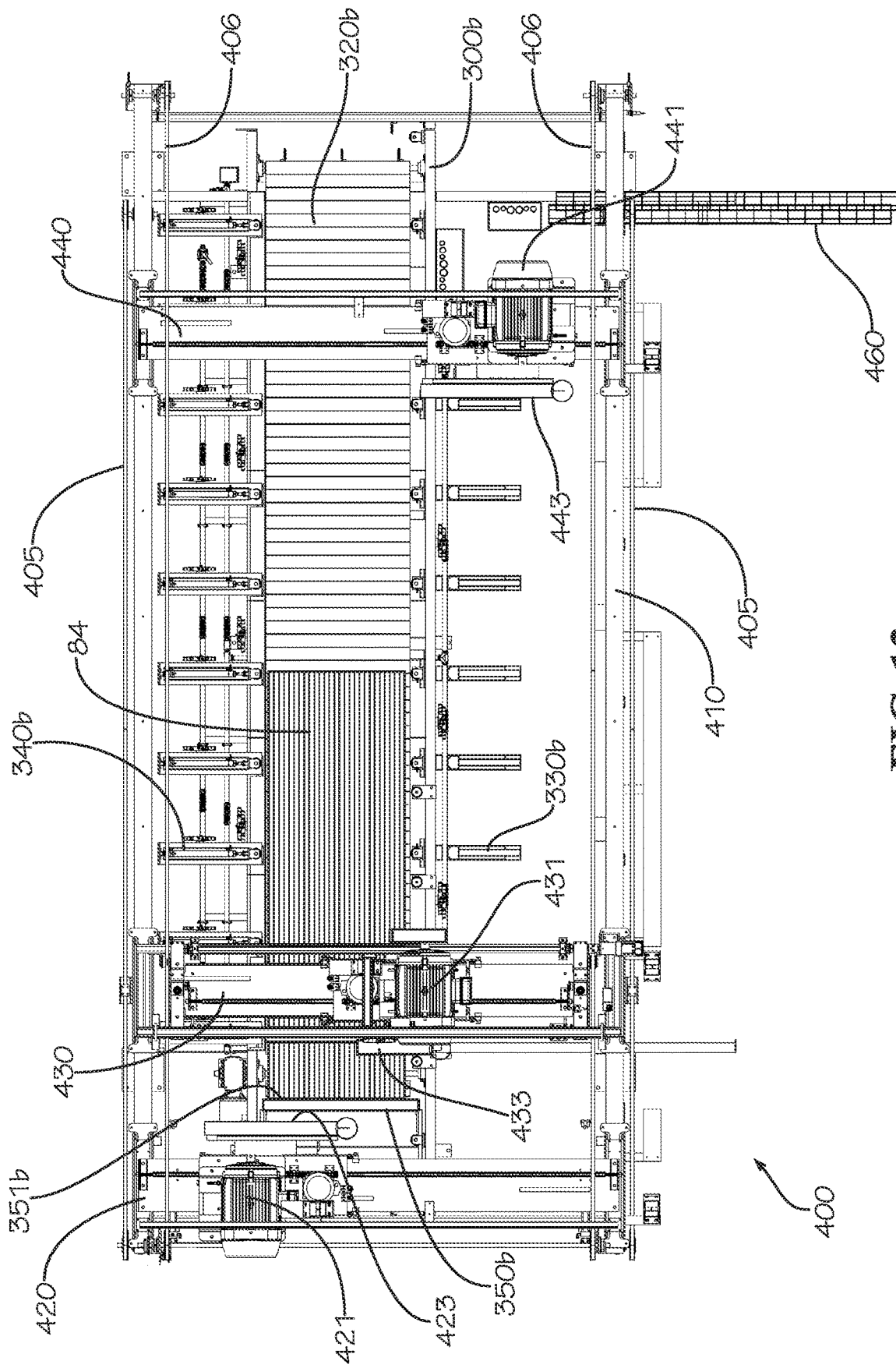
FIG. 13 is a top view of the processing station of FIG. 9 showing the material being processed.
Figure 14:
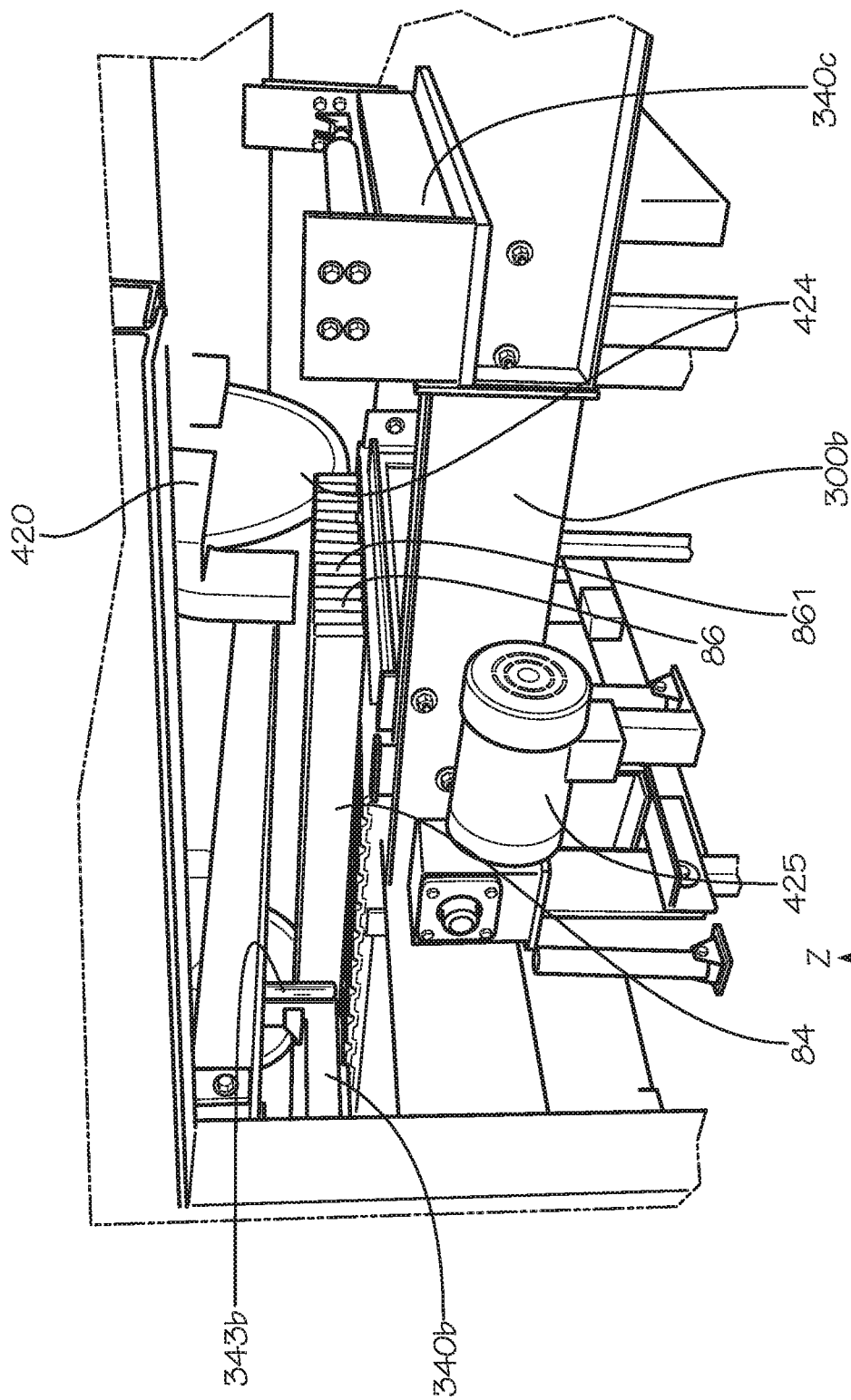
FIG. 14 is a rear perspective view of the first tool of the processing station of FIG. 9 showing the material being processed.
Figure 15:
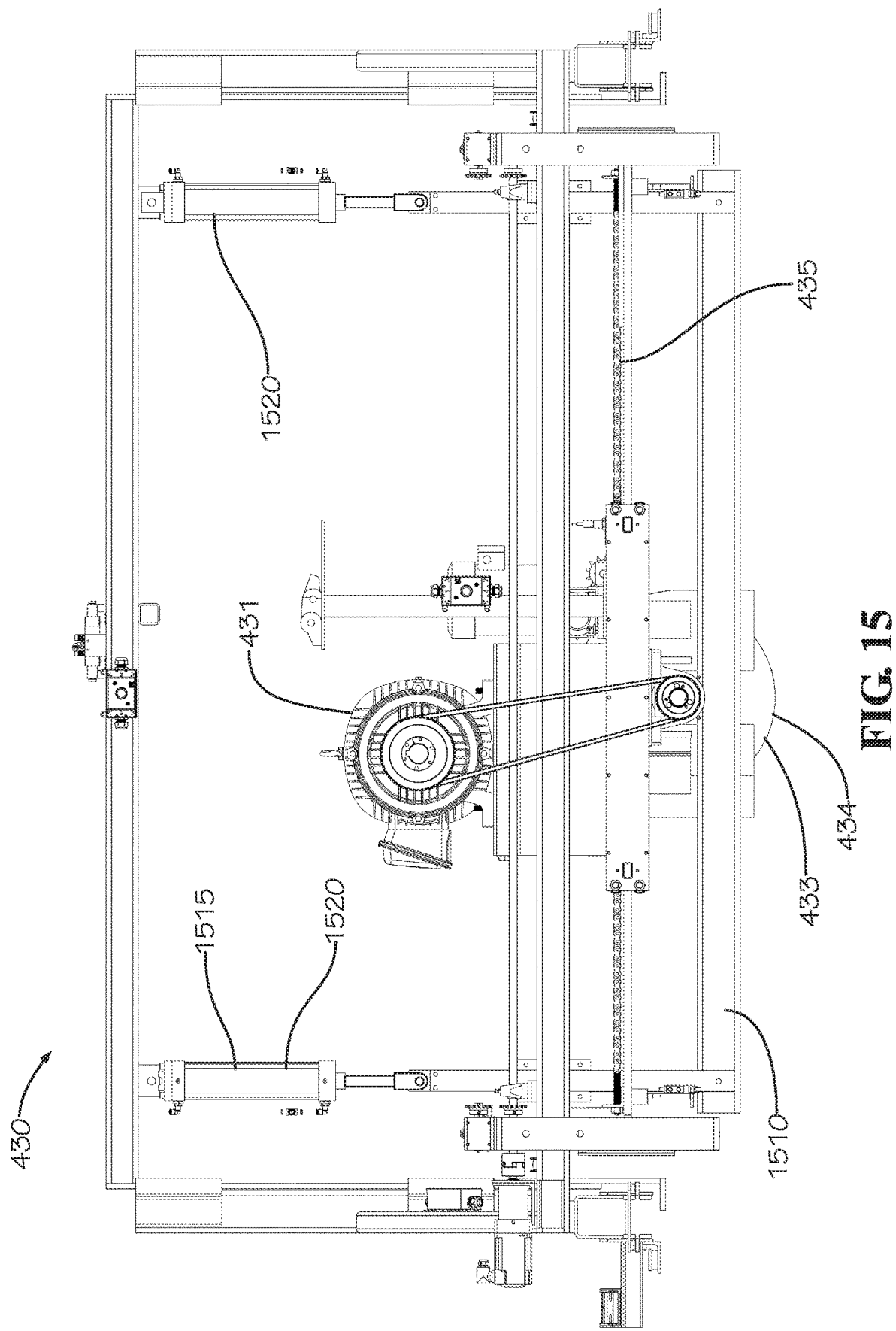
FIG. 15 is a side view of a second tool of the processing station of FIG. 9.

In one aspect, as shown in FIGS. 12 and 13, the processing station 400 can be operably connected to and straddled over the processing station conveyor 300b. As shown in FIGS. 13-15, the processing station 400 can comprise a support frame 410, a first tool assembly 420, a second tool assembly 430, and a third tool assembly 440. As shown in FIG. 12, each of the tool assemblies 420,430,440 can respectively comprise a frame 422,432,442 and a tool 423, 433,443 coupled to the respective frame 422,432,442. The processing station 400 can comprise a motion control device 405 or a motion control device 406 for controlling the position of the tool assemblies 420,430,440 along the X axis. Each of the tool assemblies 420,430,440 can comprise motion control devices 425,435,445 for respectively controlling the position of the tool assemblies 420,430,440 along the Y axis. Each of the tool assemblies 420,430,440 can comprise motion control devices for respectively controlling the position of the tools 423,433,443—including a cutting blade thereof when present—along the Z axis. Each of the tool assemblies 420,430,440 can comprise drive motors 421,431,441 for driving the specific processing operations of the tools 423,433,443. The processing station 400 can further comprise a wire management system 460; an electrical system (not shown); and a pneumatic, hydraulic, or other fluid drive system (not shown).

In one aspect, the processing station 400 can comprise at least one controller (not shown) for controlling the operation of each of the tool assemblies 420,430,440. In another aspect, the controller 190 can control the operation of each of the tool assemblies 420,430,440. Various sensors (not shown) for sensing the location of the material layer 84 can be used to determine the position of the tool assemblies 420,430,440 at any one moment during operation of the processing station 400.

Figure 16:
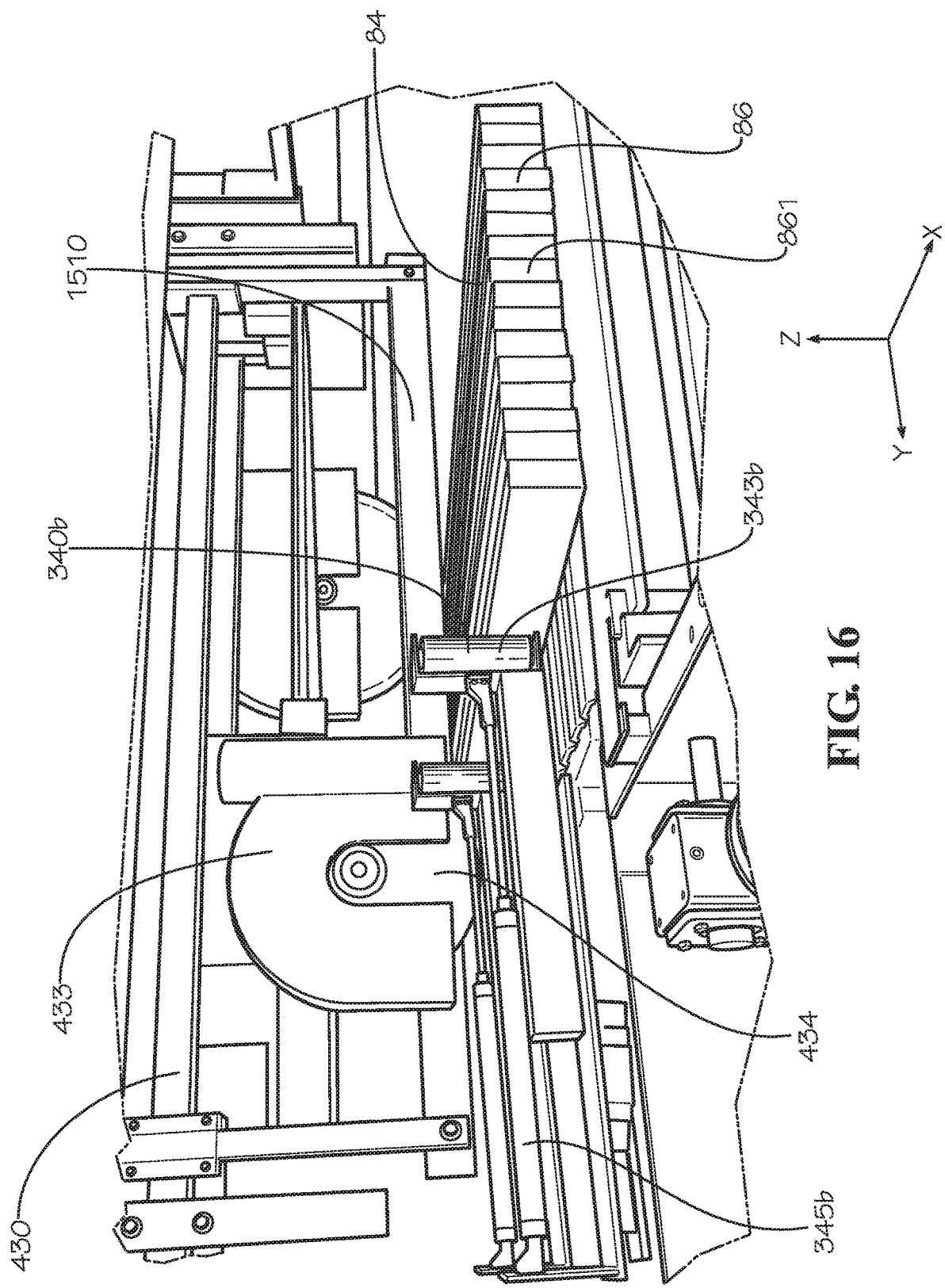
FIG. 16 is a side perspective view of the processing station of FIG. 9 showing a second tool of the processing station.
Figure 17:
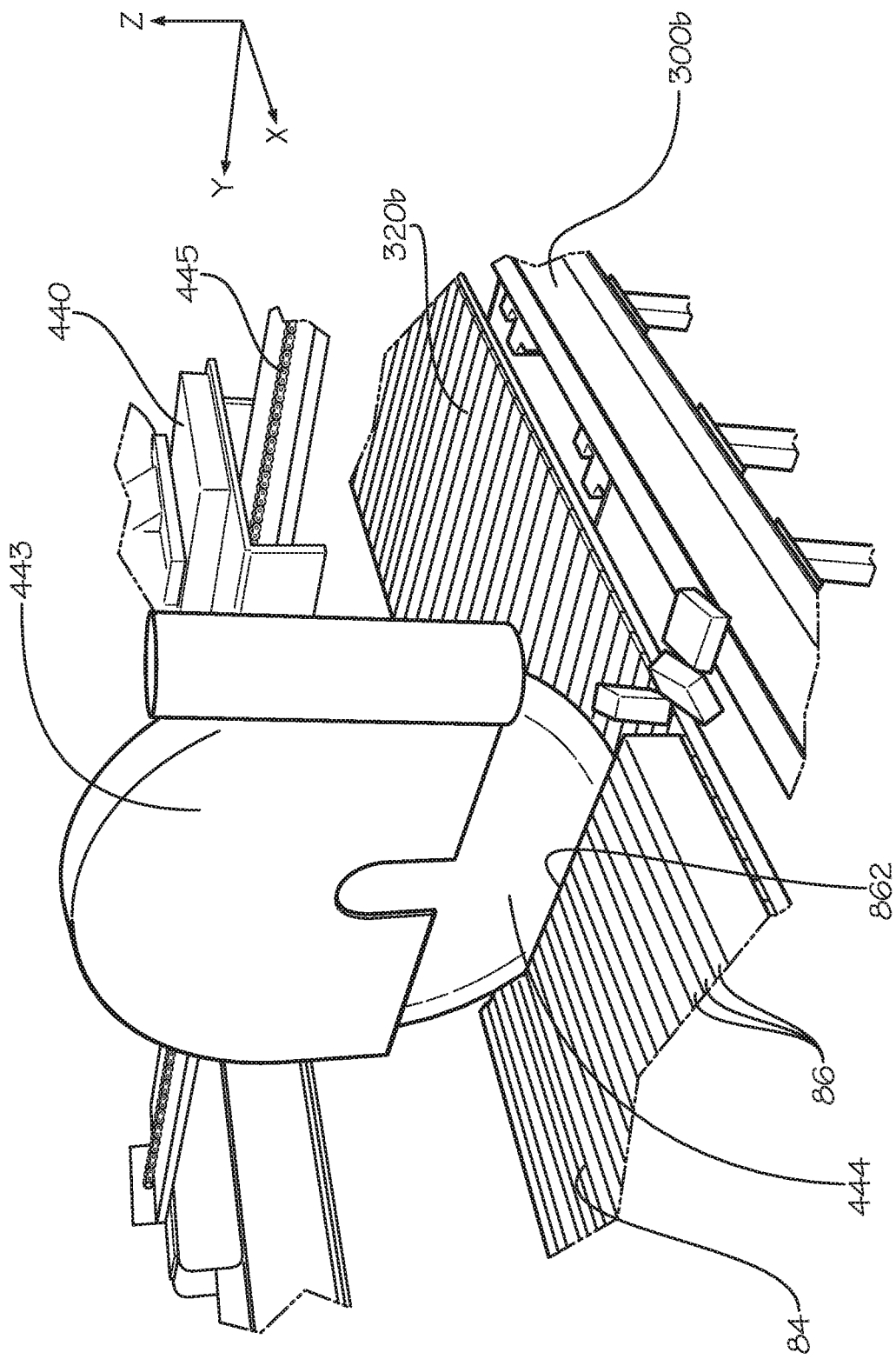
FIG. 17 is a front perspective view of the processing station of FIG. 9 showing a third tool of the processing station.

FIGS. 14-17 show additional structure of the tool assemblies 420,430,440. As shown in FIG. 14, the tool assembly 420 can comprise a cutting blade 424, which as described below can be configured to make a trim cut in the material layer 84, which can result in a first end 861 of each individual piece 86 being aligned at the same point on the X axis. As shown in FIGS. 15 and 16, the tool assembly 430, which can be a "hogger," can comprise a press bar 1510 and a motion control device 1515 for moving the press bar 1510 up and down. The press bar can apply as much as 900-1000 pounds of force or more in holding down the material layer 84. The motion control device 1515 can comprise control cylinders 1520. As shown in FIG. 16, the tool assembly 430 can also comprise a cutting blade 434, which as described below can be configured to cut the notch 95 in the material layer 84. As shown in FIG. 17, the tool assembly 440 can comprise a cutting blade 444 configured to make an end cut in the material layer 84, which as described below can result in a second end 862 of each individual piece 86 being cut to the same length. In one aspect, the cutting blade 424,434, 444 can be a single-thickness blade comprising any desired standard or custom kerf (i.e., cutting width). In another aspect, the cutting blade 424,434,444 can comprise a dado blade or dado set for making wider cuts.

As shown in FIG. 18, the outfeed conveyor 300c can be operably connected to the process station conveyor 300b and can comprise each of the aforementioned components.

As shown in FIG. 19, the outfeed booklifter 500b can be operably connected to the outfeed conveyor 300c. As shown, the front edge 89 of the material layer 84 can again be aligned at a position B before removal of the material layer 84 by the booklifter 500b. The gripper 550b of the booklifter 500b is shown suspended from the frame 510b and above the material layer 84 positioned on the outfeed conveyor 300c. A pair of opposing jaws 553 are shown before gripping and lifting of the material layer 84. As described previously, the control cylinder 556 can be configured to draw the jaws 553 around opposite sides of the material layer 84 with sufficient force to be able to lift and transport the material layer 84 without the material layer 84 falling or changing shape.

Figure 20:
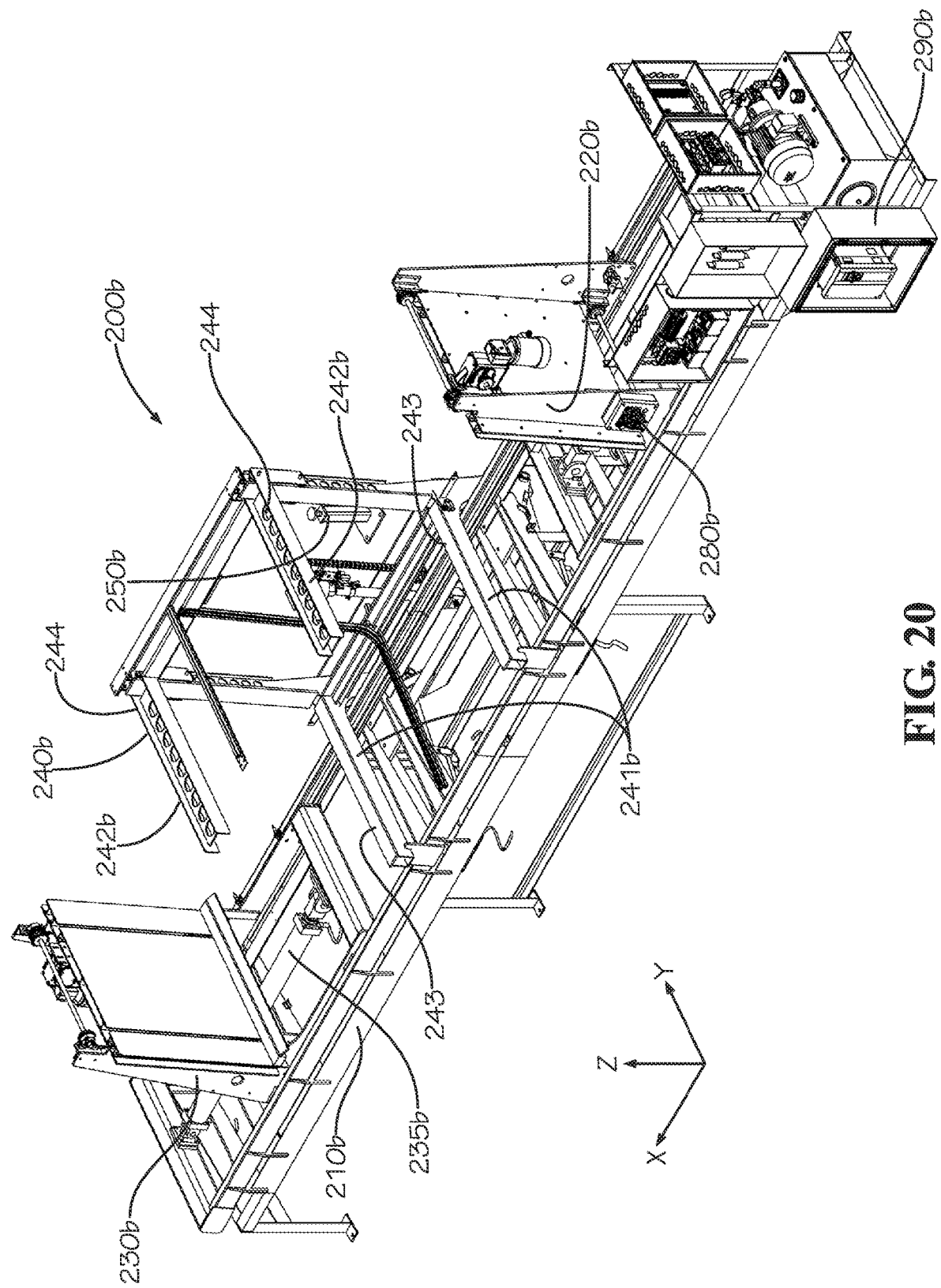
FIG. 20 is a front perspective view of an outfeed offsetting unit of the material processing system of FIG. 1 in an unloaded condition.

The outfeed offsetter 200b is shown in FIG. 20 without the stack of material 80 and can be operably connected to the outfeed booklifter 500b and the outfeed conveyor 300c. The outfeed offsetter 200b can comprise a support frame 210b, a first sidewall 220b, a second sidewall 230b, a tilt assembly 240b, a tilt assembly support 250b, a manual controller 280b, and the controller 290b. The support frame 210b can be made stationary, at least relative to the other subsystems of the material processing system 100, by securing various support devices such as legs to the surface on which the support frame 210b is positioned. Each of the first sidewall 220b, the second sidewall 230b, and the tilt assembly 240b can be mechanically coupled to the support frame 210b. Each of the first sidewall 220b and the second sidewall 230b, shown in FIG. 20 moved away from each other along the X axis to accommodate a stack of material 80 comprising a longer length than that shown in FIGS. 3-6, can further comprise motion control devices 225b,235b (225b not shown) for respectively moving the first sidewall 220b and the second sidewall 230b with respect to the support frame 210b.

In one aspect, each of the fixed frames 241a,b of the tilt assemblies 240a,b can comprise contact strips 243, which are configured to contact the stack of material 80 when the stack of material 80 is loaded onto the offsetters 200a,b and which can be made smooth to reduce friction at the interface therebetween by using a material such as, for example and without limitation, ultra-high molecular weight polyethylene (UHMW). In another aspect, the fixed frames 241a,b of the tilt assemblies 240a,b can comprise a rough interfacing material in place of contact strips 243 or in addition to contact strips 243 such as, for example and without limitation, a rubber or silicone material resulting in a higher coefficient of friction at the interface with the stack of material 80. In yet another aspect, the fixed frames 241a,b of the tilt assemblies 240a,b can comprise rollers in place of contact strips 243 or in addition to contact strips 243 in order to further reduce or eliminate friction at the interface between the stack of material 80 and the offsetter 200a,b along the Y axis but discourage movement of the stack of material 80 along the X axis. In one aspect, each of the adjustable frames 242a,b of the tilt assemblies 240a,b can comprise rollers 244 to minimize friction at the interface between the stack of material 80 and the adjustable frames 242a,b of the offsetter 200a, b.

Figure 21A:
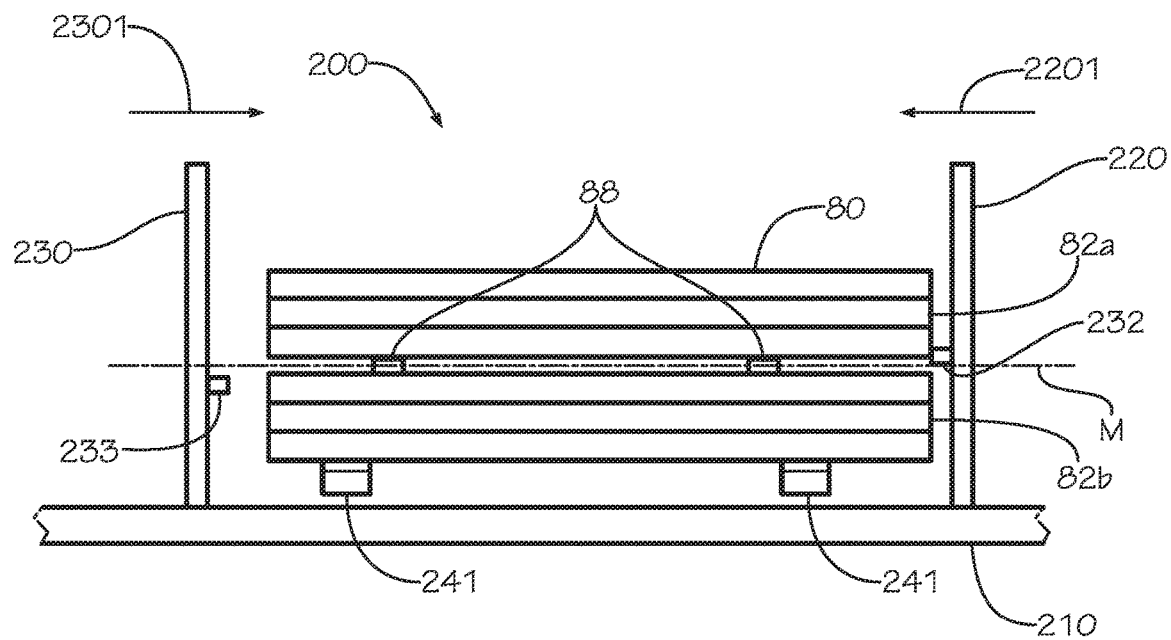
FIG. 21A is a sectional view of the infeed offsetter of FIG. 3 taken along line 21-21 of FIG. 3 during a first substep of a method of use.
Figure 21B:
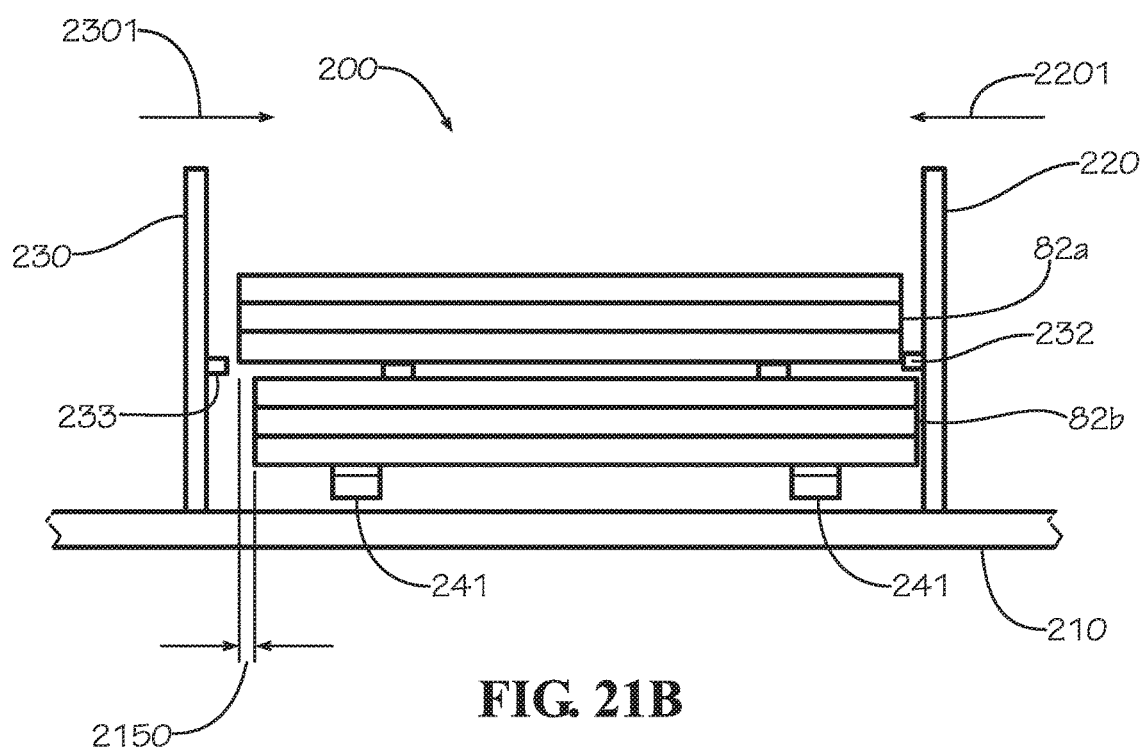
FIG. 21B is a sectional view of the infeed offsetter of FIG. 3 during a second substep of a method of use.
Figure 21C:
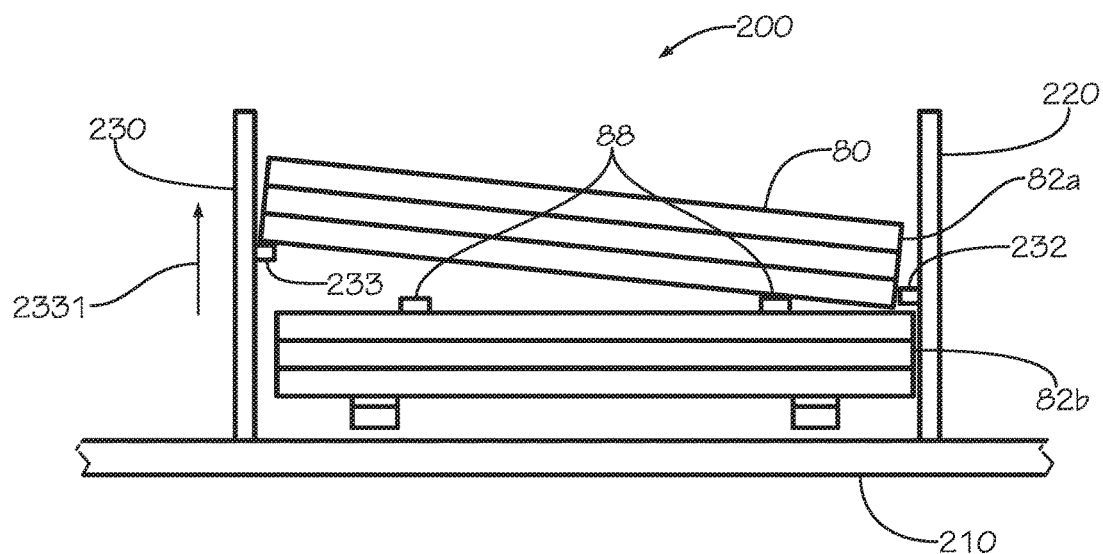
FIG. 21C is a sectional view of the infeed offsetter of FIG. 3 during a third substep of a method of use.
Figure 21D:
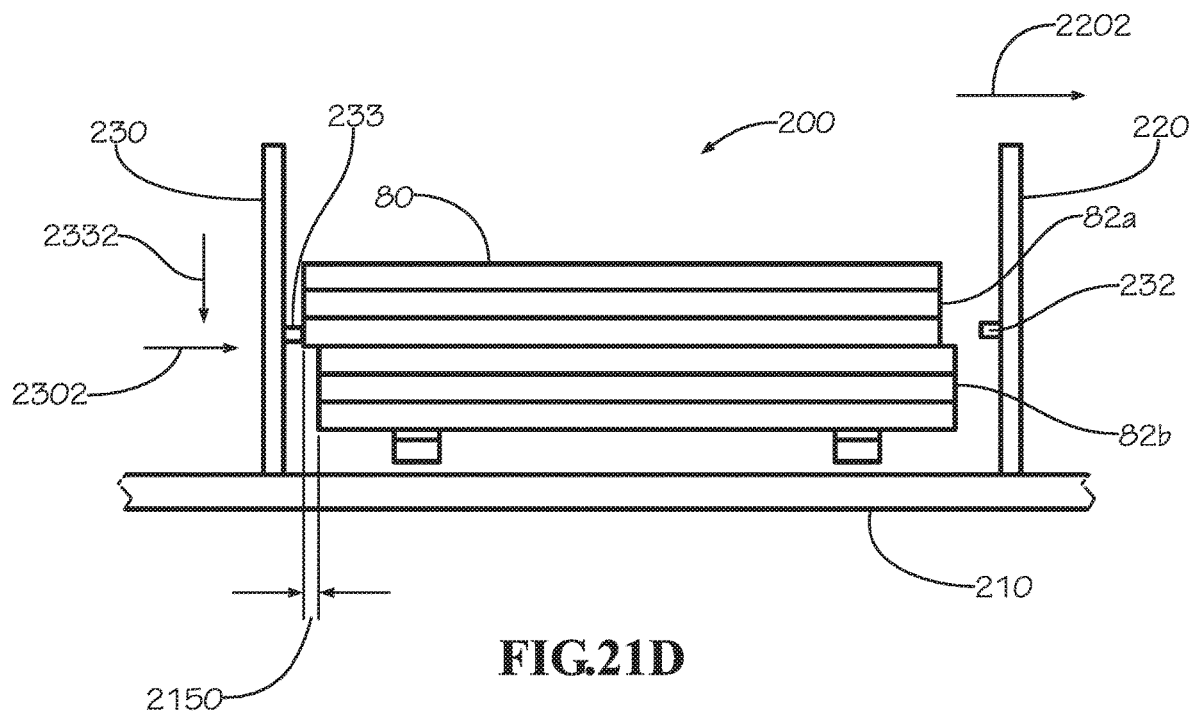
FIG. 21D is a sectional view of the infeed offsetter of FIG. 3 during a fourth substep of a method of use.
Figure 22:
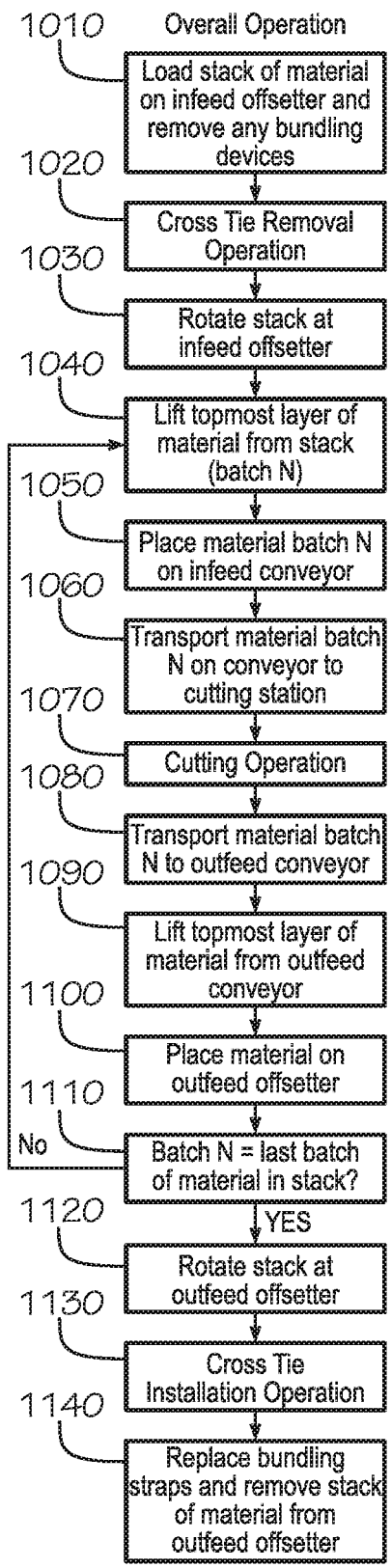
FIG. 22 is a first flowchart showing the overall operation of the material processing system of FIG. 1 in accordance with one aspect of the current disclosure.
Figure 23:
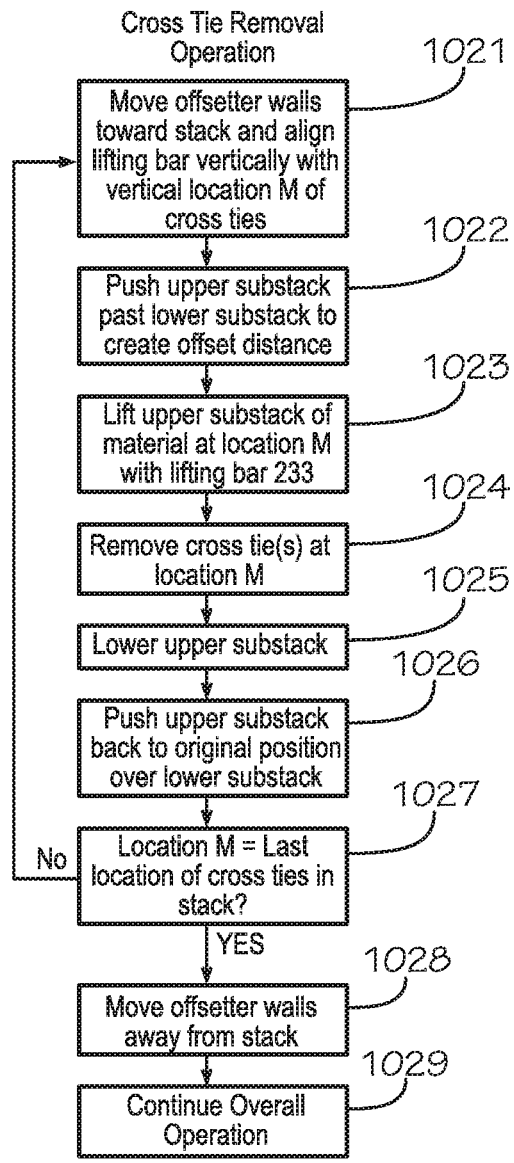
FIG. 23 is a second flowchart showing a cross tie removal operation of the first flowchart of FIG. 22.

Referencing the flowcharts shown in FIGS. 22-25, FIGS. 21A-21D, and various other figures, the following description will further describe exemplary uses of the material processing system 100. As shown in FIG. 22, a method of using the material processing system 100 can comprise one or more of a series of steps 1010-1140. In one aspect, as shown in step 1010, material can be supplied to the material processing system 100 by transporting a stack of material to the infeed offsetter 200a by a vehicle such as a forklift. In another aspect, the stack of material is delivered to the infeed offsetter 200a by a conveyor (not shown) or any other feasible mechanisms.

With reference to FIGS. 21A-21D and FIG. 23, the step 1020, which can comprise several substeps 1021-1029, can comprise removing the cross ties 88 from the stack of material 80 containing a first portion or upper substack 82a and a second portion or lower substack 82b separated by the cross ties 88 and positioned on the offsetter 200.

As shown in FIG. 21A, a substep 1021 can comprise moving the sidewalls 220,230 towards the stack of material 80 in respective directions 2201 and 2301. The substep 1021 can also comprise aligning the lifting bar 232 vertically with the bottom of the upper substack 82a and above the top of the lower substack 82b (i.e., vertically with a vertical location M of the cross ties 88).

As shown in FIG. 21B, a substep 1022 can comprise moving the first sidewall 220 further in the direction 2201 so as to push the upper substack 82a towards the second sidewall 230 while the lower substack 82b remains stationary, thereby producing a horizontal offset distance 2150 between the upper substack 82*a* and the lower substack 82*b*. Optionally, the lifting bar 233 extending from the second sidewall 230 can be adjusted to contact the lower substack 82*b* at a topmost material layer 84 during the time that the upper substack 82*a* is being pushed towards the second sidewall 230.

As shown in FIG. 21C, a substep 1023 can comprise moving the lifting bar 233 in an upward direction 2331 to lift the upper substack 82*a* at an end proximate to the second sidewall 230. After lifting the upper substack 82*a* to a sufficient height for the upper substack 82*a* to clear or free the cross ties 88, a substep 1024 can comprise removing the cross ties 88 from the stack of material 80 by pulling the cross ties 88 out from between the upper substack 82*a* and the lower substack 82*b* by hand. In another aspect, the cross ties 88 can be removed by an automated mechanism.

As shown in FIG. 21D, a substep 1025 can comprise moving the lifting bar 233 in a downward direction 2332 to lower the upper substack 82*a* until the upper substack 82*a* rests directly on top of the lower substack 82*b*.

Also as shown in FIG. 21D, a substep 1026 can comprise moving the first sidewall 220 in a direction 2202 away from the stack of material 80 to provide clearance for adjusting the position of the upper substack 82*a*. The substep 1026 can also comprise moving the second sidewall 230 in a direction 2302 so as to push the upper substack 82*a* back towards the first sidewall 220 while the lower substack 82*b* remains stationary, thereby causing the horizontal offset distance 2150 between the upper substack 82*a* and the lower substack 82*b* to approach zero. Optionally, the lifting bar 232 extending from the first sidewall 220 can be adjusted to contact the lower substack 82*b* at a topmost material layer 84 during the time that the upper substack 82*a* is being pushed back towards the first sidewall 220.

A substep 1027 can comprise determining whether the location in the stack of material from which the cross ties 88 were removed (i.e., the vertical location M) is the final location in which the cross ties 88 were located in the stack of material 80. If the answer is NO (i.e., additional cross ties exist inside the stock of material 80), the substeps 1021-1027 can be repeated until all of the cross ties 88 have been removed.

A substep 1028 can comprise moving both of the sidewalls 220,230 away from the stack of material 80 to provide clearance where required for the tilt assembly 240 to rotate the stack of material 80 in a subsequent step without interfering with the sidewalls 220,230. A substep 1029 can comprise ending the step 1020 and continuing to the next step in the method.

A step 1030 can comprise rotating the stack of material 80 at the infeed offsetter 200*a* by rotating the tilt assembly 240*a*. The step 1030 can further comprise rotating the stack of material 80 until the side surface 83 of the stack of material 80 faces upward and is aligned with a horizontal orientation. The step 1030 can further comprise rotating the tilt assembly 240*a* until the tilt assembly 240*a* contacts the tilt assembly support 250*a*.

A step 1040 can comprise lifting a topmost material layer 84 from the stack of material 80 using the gripper 550*a* of the infeed booklifter 500*a*. In one aspect, the booklifter 500*a* can lift a material layer 84 of the stack of material 80 without first rotating the stack of material 80.

A step 1050 can comprise transporting the topmost material layer 84 to the transfer conveyor 300*a* using the infeed booklifter 500*a*.

A step 1060 can comprise transporting the topmost material layer 84 from the transfer conveyor 300*a* to the processing station 400 on the processing station conveyor 300*b*. The step 1060 can further comprise stopping movement of the material layer 84 with the stop surface 351*b* of the material stop 350*b*.

Figure 24:
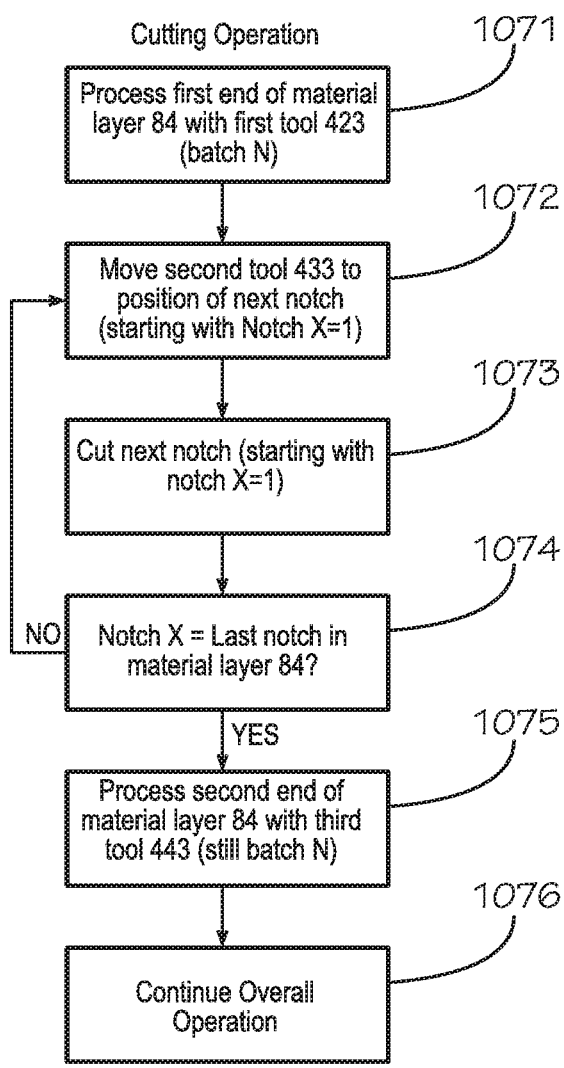
FIG. 24 is a third flowchart showing a cutting operation of the first flowchart of FIG. 22.
Figure 25:
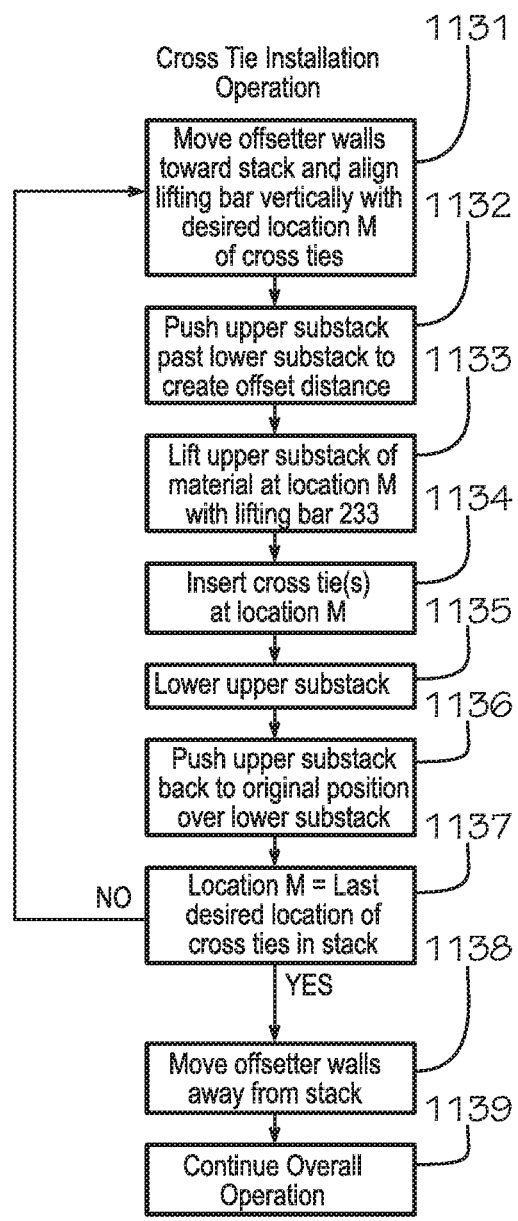
FIG. 25 is a fourth flowchart showing a cross tie installation operation of the first flowchart of FIG. 22.

With reference to FIG. 24, a step 1070, which can comprise several substeps 1071-1076, can comprise processing a material layer 84 in the processing station 400. In one aspect, a substep 1071 can comprise positioning a tool such as the first tool 423 at a desired location for a cut. The substep 1071 can further comprise processing the first end of the material layer 84 corresponding to the first end 861 of each individual piece 86, e.g., by cutting the end of the material layer 84 with the first tool 423 to create a trim cut. The substep 1071 can further comprise ejecting any resulting cuttings to an area even with or below the surface of the belt 323*b* of the processing station conveyor 300*b*. The substep 1071 can further comprise moving to a point even with or below the surface of the belt 323*b* of the processing station conveyor 300*b* any of the material stop 350, the first guides 330*b*, or the second guides 340*b* that would interfere with the first tool 423.

A substep 1072 can comprise positioning a tool such as the second tool 433 at a desired location for a notch. A substep 1072 can further comprise adjusting the depth of cut of the cutting blade 434 automatically based on the dimensions of the material loaded into the material processing system 100. The substep 1072 can further comprise moving to a point even with or below the surface of the belt 323*b* of the processing station conveyor 300*b* any of the material stop 350, the first guides 330*b*, or the second guides 340*b* that would interfere with the second tool 433. The substep 1072 can further comprise ejecting any resulting cuttings to an area even with below the surface of the belt 323*b* of the processing station conveyor 300*b*.

The substep 1073 can further comprise processing the material layer 84, e.g., by cutting a notch 95 (shown in FIG. 19) in each board of the material layer 84 with the second tool 433. In one aspect, the substep 1073 can comprise making a single cut with the cutting blade 434 comprising a thickness that is approximately equal to the width of the notch 95. In another aspect, the substep 1073 can comprise making multiple cuts with the cutting blade 434 to create the notch 95.

A substep 1074 can comprise determining whether the location of the notch 95 already cut in the material layer 84 is the last notch to be cut in the material layer 84. If the answer is NO (i.e., additional notches are required), the substeps 1072-1074 can be repeated until all the desired notches have been cut or until the other desired processing steps have been performed on the material layer 84.

In one aspect, a substep 1075 can comprise positioning a tool such as the third tool 443 at a desired location for a cut. The substep 1075 can further comprise processing a second end of the material layer 84 corresponding to the second end 862 of each individual piece 86, e.g., by cutting the material layer 84 with the third tool 443. The substep 1075 can further comprise ejecting the resulting cuttings to an area even with or below the surface of the belt 323*b* of the processing station conveyor 300*b*. The substep 1075 can further comprise moving to a point even with or below the surface of the belt 323*b* of the processing station conveyor 300*b* any of the material stop 350, the first guides 330*b*, or the second guides 340*b* that would interfere with the third tool 443.

A substep 1076 can comprise ending the step 1070 and continuing to the next step in the method. In another aspect of the step 1070, it is contemplated that the steps performed by each of the first tool 423, the second tool 433, and the third tool 443 in the above substeps can all be performed by a single tool that is configured to perform the work of the first tool 423, the second tool 433, and the third tool 443. In one aspect, each of the tool assemblies 420,430,440 can be configured to move the tools 423,433,443 in any of the X, Y, or Z directions with respect to the support frame 410 to process the material layer 84.

A step 1080 can comprise transporting the material layer 84 from the processing station 400 to the outfeed conveyor 300c. A step 1090 can comprise lifting the material layer 84 from the outfeed conveyor 300c using the gripper 550b of the outfeed booklifter 500b. A step 1100 can comprise transporting the material layer 84 from the outfeed conveyor 300c to the tilt assembly 240b of the outfeed offsetter 200b using the gripper 550b of the outfeed booklifter 500b.

A step 1110 can comprise determining whether the material layer 84 is the last material layer 84 to be processed in the stack of material 80. If the answer is NO (i.e., additional material layers 84 are to be processed before forming a new stack of material 80 at the outfeed offsetter 200b), the substeps 1040-1110 can be repeated until all the desired notches have been cut or until the other desired processing steps have been performed on the material layer 84. In one aspect, the entire stack of material 80 at the infeed offsetter 200a can be processed into a stack of material 80 at the outfeed offsetter 200b comprising the same number or material layers 84 or individual pieces 86. In another aspect, a single stack of material 80 at the infeed offsetter 200a can be converted into multiple separately bundled stacks of material 80 at the outfeed offsetter 200b. In yet another aspect, multiple stacks of material 80 at the infeed offsetter 200a can be converted into a single stack of material 80 at the outfeed offsetter 200b.

A step 1120 can comprise rotating the stack of material at the outfeed offsetter 200b by rotating the tilt assembly 240b. The step 1120 can further comprise rotating the tilt assembly 240b away from the tilt assembly support 250b.

With reference to FIGS. 21A-21D and FIG. 25, the step 1130, which can comprise several substeps 1131-1139, can be similar to the elements of the substeps 1021-1029 but can instead comprise inserting the cross ties 88 into the stack of material 80 to divide the stack of material 80 into a first portion or upper substack 82a and a second portion or lower substack 82b.

As shown in FIG. 21A but with the cross ties 88 already removed, a substep 1131 can comprise moving the sidewalls 220,230 towards the stack of material 80 in respective directions 2201 and 2301. The substep 1131 can also comprise aligning the lifting bar 232 vertically with the bottom of the desired upper substack 82a and above the top of the desired lower substack 82b.

As shown in FIG. 21B but with the cross ties 88 already removed, a substep 1132 can comprise moving the first sidewall 220 further in the direction 2201 so as to push the desired upper substack 82a towards the second sidewall 230 while the desired lower substack 82b remains stationary, thereby producing a horizontal offset distance 2150 between the desired upper substack 82a and the desired lower substack 82b. Optionally, the lifting bar 233 extending from the second sidewall 230 can be adjusted to contact the desired lower substack 82b at a topmost material layer 84 during the time that the upper substack 82a is being pushed towards the second sidewall 230.

As shown in FIG. 21C, a substep 1133 can comprise moving the lifting bar 233 in an upward direction 2331 to lift the desired upper substack 82a at an end proximate to the second sidewall 230. After lifting the upper substack 82a to a sufficient height for the upper substack 82a to allow insertion of the cross ties 88, a substep 1134 can comprise inserting the cross ties into the stack of material 80 between the desired upper substack 82a and the desired lower substack 82b.

As shown in FIG. 21D but with the cross ties 88 inserted between the upper substack 82a and the lower substack 82b, a substep 1135 can comprise moving the lifting bar 233 in a downward direction 2332 to lower the upper substack 82a until the upper substack 82a rests directly on top of the lower substack 82b.

Also as shown in FIG. 21D, a substep 1136 can comprise moving the first sidewall 220 in a direction 2202 away from the stack of material 80 to provide clearance for adjusting the position of the upper substack 82a. The substep 1136 can further comprise moving the second sidewall 230 in a direction 2302 so as to push the upper substack 82a back towards the first sidewall 220 while the lower substack 82b remains stationary, thereby causing the horizontal offset distance 2150 between the upper substack 82a and the lower substack 82b to approach zero. Optionally, the lifting bar 233 extending from the second sidewall 230 can be adjusted to contact the lower substack 82b at a topmost material layer 84 during the time that the upper substack 82a is being pushed back towards the second sidewall 230.

A substep 1027 can comprise determining whether the location in the stack of material at which the cross ties 88 were inserted is the final location in which the cross ties 88 are to be inserted into the stack of material 80. If the answer is NO (i.e., additional cross ties are to be inserted inside the stack of material 80), the substeps 1131-1137 can be repeated until all the desired cross ties 88 have been inserted.

A substep 1028 can comprise moving both of the sidewalls 220,230 away from the stack of material 80 to provide clearance where required for the stack of material 80 to be removed from the offsetter 200 without interfering with the sidewalls 220,230. A substep 1139 can comprise ending the step 1130 and continuing to the next step in the method.

A step 1140 can comprise bundling the stack of material 80 with at least one bundling device such as, for example and without limitation a metal or polymer strap. It is contemplated that the step 1140 of bundling the stack of material 80 can be performed automatically by an automatic bundling machine (not shown). In one aspect, the material can be removed from the material processing system 100 by picking up the stack of material from the outfeed offsetter 200b by a vehicle such as a forklift. In another aspect, the stack of material can be removed from the outfeed offsetter 200b by a conveyor (not shown) or any other feasible mechanisms.

Every step in the method can be automatically programmed and controlled by a controller such as the controller 190 and can be run unsupervised from a point after the cross ties 88, if any, are removed from the stack of material 80 at the infeed offsetter 200a and up until the cross ties 88, if any, are ready to be installed in the stack of material 80 at the outfeed offsetter 200b. A programmable logic controller (PLC) can receive input via a touchscreen interface from the operator of the material processing system 100 but otherwise can keep all the internal code in a password-protected storage location. The input can comprise, for example and without limitation, the original size of the board pieces (thickness×width×length), the specifications of the notches (quantity, location, width, depth), and the final cut length of the pieces. In one aspect, the material processing system 100 is able to determine through the use of sensors how many material layers 84 are in a stack of material 80, the width of the stack of material 80 (such as whether the stack of material 80 is 28" wide or 32" wide), and other variables. In another aspect, this information and other information can be entered as inputs by the operator.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A material processing system comprising:
    an offsetter configured to receive a stack of material in an original position, move the stack of material to a new position offset horizontally from the original position, and reorient the stack of material by rotating the stack of material until a side surface of the stack of material faces upward and is aligned with a horizontal orientation; the stack of material comprising a plurality of rigid pieces arranged in a plurality of material layers, the rigid pieces arranged side-by-side in a horizontal direction in each material layer, each of the plurality of rigid pieces defining a length, a width, and a thickness; the offsetter comprising a first sidewall, a second sidewall opposite from the first sidewall, a first lifting bar coupled to the first sidewall, and a second lifting bar coupled to the second sidewalk each of the first lifting bar and the second lifting bar defining a top surface and a bottom surface and configured to lift a portion of the stack of material; and
    a processing station operably connected to the offsetter and configured to process a material layer of the stack of material by making a modification to each of the plurality of rigid pieces in a single operation of the processing station while the plurality of rigid pieces are arranged side-by-side in the horizontal direction.

2. The system of claim 1, wherein the offsetter is an infeed offsetter configured to feed the stack of material to the processing station, the system further comprising an outfeed offsetter configured to receive the stack of material from the processing station, the outfeed offsetter comprising a first sidewall, a second sidewall, a first lifting bar, and a second lifting bar; the first lifting bar of the outfeed offsetter coupled to the first sidewall of the outfeed offsetter and the second lifting bar of the outfeed offsetter coupled to the second side wall of the outfeed offsetter.

3. The system of claim 1, further comprising a tool configured to cut a notch in a surface of a material layer of the plurality of material layers of the stack of the material.

4. The system of claim 1, further comprising the stack of material, wherein each piece of the plurality of rigid pieces is a board.

5. The system of claim 4, wherein each of the plurality of rigid pieces is a piece of dimensional lumber.

6. The system of claim 1, further comprising a booklifter configured to lift and transport a single layer of material from the stack of material.

7. The system of claim 6, wherein the booklifter comprises a frame and a gripper suspended from the frame, the gripper comprising at least one pair of opposing jaws.

8. The system of claim 1, wherein the offsetter is an outfeed offsetter configured to receive the stack of material from the processing station.

9. The system of claim 1, wherein each of the first sidewall and the second sidewall further comprises a motion control device, wherein a vertical position of the first lifting bar is adjustable with the motion control device of the first sidewall and a vertical position of the second lifting bar is separately adjustable with the motion control device of the second sidewall.

10. A method of processing a material, the method comprising:
    loading a stack of material on an infeed offsetter at an original position, the infeed offsetter configured to receive, move, and reorient the stack of material; the stack of material comprising a plurality of rigid pieces arranged in a plurality of material layers, the rigid pieces arranged side-by-side in a horizontal direction in each material layer, each of the plurality of rigid pieces defining a length, a width, and a thickness; the infeed offsetter comprising a first sidewall, a second sidewall opposite from the first sidewall, a first lifting bar coupled to the first sidewall, and a second lifting bar coupled to the second sidewall; the stack of material comprising a first end and a second end distal from the first end;
    lifting the second portion of the stack of material away from the first portion of the stack of material by the first lifting bar of the infeed offsetter pushing upward on one of the first end and the second end of the stack of material;
    moving the stack of material to a new position offset horizontally from the original position; and
    reorienting the stack of material by rotating the stack of material until a side surface of the stack of material faces upward and is aligned with a horizontal orientation.

11. The method of claim 10, wherein the stack of material further comprises a first portion and a second portion, the first portion positioned above the second portion and separated from the second portion by at least one cross tie, the method further comprising removing the cross tie after lifting the second portion of the stack of material away from the first portion of the stack of material.

12. The method of claim 10, further comprising lifting a first material layer of the plurality of material layers of the stack of material and transporting the first material layer to a processing station, the processing station operably connected to the offsetter and configured to process the material layer of the stack of material by making a modification to each of the plurality of rigid pieces in a single operation of the processing station while arranged side-by-side in a horizontal orientation.

13. The method of claim 10, further comprising transporting the material layer on a conveyor to the processing station.

14. The method of claim 10, further comprising processing the material layer of the stack of material by making a modification to each of the plurality of rigid pieces in a single operation of the processing station while the plurality of rigid pieces are arranged side-by-side in a horizontal direction.

15. The method of claim 14, wherein processing the material layer of the stack of material comprises cutting a one of a trim cut and an end cut in an end of the stack of material and cutting a notch in a surface of the material layer of the stack of material.

16. The method of claim 10, wherein the stack of material is an infeed stack of material, the method further comprising:
    processing each of the plurality of material layers of the infeed stack of material at the processing station by making a modification to each of the plurality of rigid pieces in a single operation of the processing station while the plurality of rigid pieces are arranged side-by-side in a horizontal direction;
    transporting each of the plurality of material layers of the infeed stack of material to an outfeed offsetter, the outfeed offsetter configured to receive, move, and reorient the plurality of rigid pieces as an outfeed stack of material; the outfeed offsetter comprising a first sidewall, a second sidewall opposite from the first sidewall, a first lifting bar coupled to the first sidewall, and a second lifting bar coupled to the second sidewall, each of the first lifting bar and the second lifting bar of the outfeed offsetter configured to lift a portion of the outfeed stack of material;
    rotating the outfeed stack of material with the outfeed offsetter.

17. The method of claim 16, wherein the outfeed stack of material comprises a first end and a second end distal from the first end, the method further comprising:
    pushing a portion of the outfeed stack of material in a direction from the first end to the second end by the first lifting bar of the outfeed offsetter;
    lifting a portion of the outfeed stack of material at the second end by the second lifting bar of the outfeed offsetter to create a second portion separated from a first portion by a clearance gap; and
    inserting a cross tie in the clearance gap.

18. A method of processing a material, the method comprising:
    receiving a stack of material at an offsetter, the offsetter configured to receive, move, and reorient the stack of material; the stack of material comprising a plurality of rigid pieces arranged in a plurality of material layers, the rigid pieces arranged side-by-side in a horizontal direction in each material layer, each of the plurality of rigid pieces defining a length, a width, and a thickness; the offsetter comprising a first sidewall, a second sidewall opposite from the first sidewall, a first lifting bar coupled to the first sidewall, and a second lifting bar coupled to the second sidewall, each of the first lifting bar and the second lifting bar configured to lift a portion of the stack of material;
    moving the stack of material to a new position offset horizontally from the original position;
    reorienting the stack of material by rotating the stack of material until a side surface of the stack of material faces upward and is aligned with a horizontal orientation or until a side surface of the stack of material faces is aligned with a vertical orientation.

19. The method of claim 18, further comprising processing each of the plurality of material layers of the stack of material at a processing station by making a modification to each of the plurality of rigid pieces in the each of the plurality of material layers in a single operation of the processing station while the plurality of rigid pieces are arranged side-by-side in a horizontal direction.

20. The method of claim 19, the stack of material comprising a first end and a second end distal from the first end, the method further comprising:
    pushing a first portion of the stack of material in a direction from a first end of the stack of material to a second end of the stack of material distal from the first end by the first lifting bar;
    lifting the first portion of the stack of material at the second end by the second lifting bar to create a second portion separated from the first portion by a clearance gap; and
    removing a cross tie from or inserting a cross tie in the clearance gap.

21. The system of claim 18, wherein each piece of the plurality of rigid pieces is a board.

* * * * *